(12) United States Patent
Ellis et al.

(10) Patent No.: US 12,292,853 B1
(45) Date of Patent: May 6, 2025

(54) OBJECT-BASED STORAGE WITH GARBAGE COLLECTION AND DATA CONSOLIDATION

(71) Applicant: Qumulo, Inc., Seattle, WA (US)

(72) Inventors: Graham Edwin Ellis, Seattle, WA (US); Ying Fairweather, Sammamish, WA (US); Thorne Davis Garvin, Spokane, WA (US); Steven Henry Haber, Seattle, WA (US); Yuxi Bai, Seattle, WA (US); Michael Anthony Chmiel, Seattle, WA (US); Pathirat Kosakanchit, Seattle, WA (US); Jonathan Michael MacLaren, Seattle, WA (US); Matthew Christopher McMullan, Bellevue, WA (US); Tyler Morrison Moody, Seattle, WA (US); Aaron James Passey, San Rafael, CA (US); Rowan Arthur Phipps, Seattle, WA (US); Thomas Gregory Rothschilds, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 18/503,082

(22) Filed: Nov. 6, 2023

(51) Int. Cl.
*G06F 16/11* (2019.01)
*G06F 12/02* (2006.01)

(52) U.S. Cl.
CPC ........ *G06F 16/122* (2019.01); *G06F 12/0253* (2013.01); *G06F 2212/702* (2013.01)

(58) Field of Classification Search
None
See application file for complete search history.

(56) References Cited

U.S. PATENT DOCUMENTS 5,165,031 A 11/1992 Pruul et al.
5,283,875 A 2/1994 Gibson et al.
(Continued)

FOREIGN PATENT DOCUMENTS

EP 1217551 A2 6/2002
EP 1498829 A1 1/2005
(Continued)

OTHER PUBLICATIONS

Office Communication for U.S. Appl. No. 17/062,500 mailed Jun. 13, 2023, 8 Pages.
(Continued)

*Primary Examiner* — Neveen Abel Jalil
*Assistant Examiner* — John J Morris
(74) *Attorney, Agent, or Firm* — John W. Branch; Branch Partners PLLC

(57) ABSTRACT

Embodiments are directed to a file system that include object stores. An object store for write requests may be provided. Write ahead log (WAL) entries that include data blocks may be generated. A WAL object may be generated based on the WAL entries and stored in the object store. An in-memory overlay may be updated to associate the data blocks with the WAL object. A checkpoint operation may be executed to: generate an index object that includes index entries that associate other data blocks with data objects stored in the object store; update the index object to include index entries that associate the data blocks with the WAL object; store the updated index object in the object store; update the in-memory overlay to remove the association of the data blocks and the WAL object and update the in memory WAL to remove records of successfully checkpointed WAL objects.

28 Claims, 18 Drawing Sheets

(56) References Cited

U.S. PATENT DOCUMENTS

| | | |
|---|---|---|
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,049,809 A | 4/2000 | Raman et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,072,911 B1 | 7/2006 | Doman et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,761,456 B1 | 7/2010 | Cram et al. |
| 7,844,580 B2 | 11/2010 | Srivastava et al. |
| 7,933,870 B1 | 4/2011 | Webster |
| 7,937,421 B2 | 5/2011 | Mikesell et al. |
| 7,956,293 B2 | 6/2011 | Echigo et al. |
| 7,958,304 B1 | 6/2011 | Goel et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,355,407 B2 | 1/2013 | Wookey et al. |
| 8,364,648 B1 * | 1/2013 | Sim-Tang ............... G06F 16/20 707/674 |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,805,786 B1 | 8/2014 | Natanzon |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,754 B2 | 9/2014 | Craggs |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B1 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,396,202 B1 * | 7/2016 | Drobychev ............ G06F 16/178 |
| 9,459,804 B1 | 10/2016 | Natanzon et al. |
| 9,501,487 B1 | 11/2016 | Yuan et al. |
| 9,519,664 B1 * | 12/2016 | Kharatishvili .......... G06F 16/27 |
| 9,547,560 B1 | 1/2017 | Lee |
| 9,600,193 B2 | 3/2017 | Ahrens et al. |
| 9,613,120 B1 * | 4/2017 | Kharatishvili ...... G06F 16/2358 |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 9,836,480 B2 | 12/2017 | Okun et al. |
| 9,846,698 B1 | 12/2017 | Panidis et al. |
| 10,073,856 B1 | 9/2018 | Cooper et al. |
| 10,095,708 B2 | 10/2018 | Passey et al. |
| 10,095,709 B2 | 10/2018 | Okun et al. |
| 10,095,729 B2 | 10/2018 | Taron et al. |
| 10,140,185 B1 | 11/2018 | Lopez et al. |
| 10,162,980 B1 | 12/2018 | Bernotavicius et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,318,494 B2 | 6/2019 | Krasnow et al. |
| 10,339,101 B1 | 7/2019 | Gupta |
| 10,346,355 B2 | 7/2019 | Godman |
| 10,387,810 B1 | 8/2019 | Kalush et al. |
| 10,409,784 B1 | 9/2019 | Krasnow et al. |
| 10,423,609 B1 | 9/2019 | Strauss |
| 10,437,509 B1 | 10/2019 | Alexeev et al. |
| 10,447,779 B2 | 10/2019 | Dieterich et al. |
| 10,459,884 B1 | 10/2019 | Godman |
| 10,459,892 B2 | 10/2019 | Godman et al. |
| 10,460,122 B1 | 10/2019 | Kirby et al. |
| 10,474,635 B1 | 11/2019 | Unger et al. |
| 10,534,758 B1 | 1/2020 | Carpenter et al. |
| 10,540,662 B2 | 1/2020 | Barlett et al. |
| 10,545,986 B2 | 1/2020 | Tappan et al. |
| 10,552,373 B2 | 2/2020 | Brow et al. |
| 10,606,812 B2 | 3/2020 | Cooper et al. |
| 10,614,033 B1 | 4/2020 | Rothschilds et al. |
| 10,614,241 B1 | 4/2020 | Kirby et al. |
| 10,621,057 B2 | 4/2020 | Tripathi et al. |
| 10,621,147 B1 | 4/2020 | Liang et al. |
| 10,664,408 B1 | 5/2020 | Chatterjee et al. |
| 10,678,663 B1 | 6/2020 | Sharma et al. |
| 10,678,671 B2 | 6/2020 | Rothschilds et al. |
| 10,725,977 B1 | 7/2020 | Chmiel et al. |
| 10,795,796 B1 | 10/2020 | Bai et al. |
| 10,860,372 B1 | 12/2020 | Bai et al. |
| 10,860,414 B1 | 12/2020 | Urban et al. |
| 10,860,546 B2 | 12/2020 | Ye et al. |
| 10,860,547 B2 | 12/2020 | Passey et al. |
| 10,877,942 B2 | 12/2020 | Okun et al. |
| 10,936,538 B1 | 3/2021 | Unger et al. |
| 10,936,551 B1 | 3/2021 | Unger et al. |
| 11,023,535 B1 | 6/2021 | Greenwood et al. |
| 11,132,126 B1 | 9/2021 | Chmiel et al. |
| 11,132,336 B2 | 9/2021 | Passey et al. |
| 11,150,823 B2 | 10/2021 | Gao et al. |
| 11,151,001 B2 | 10/2021 | Su et al. |
| 11,151,092 B2 | 10/2021 | Chmiel et al. |
| 11,157,458 B1 | 10/2021 | Carter et al. |
| 11,249,907 B1 | 2/2022 | Brewer |
| 11,256,682 B2 | 2/2022 | Taron et al. |
| 11,265,262 B1 | 3/2022 | Makie et al. |
| 11,294,604 B1 | 4/2022 | McMullan et al. |
| 11,294,718 B2 | 4/2022 | Bai et al. |
| 11,347,699 B2 | 5/2022 | Carpenter et al. |
| 11,354,273 B1 | 6/2022 | O'Neill et al. |
| 11,360,936 B2 | 6/2022 | Haber et al. |
| 11,372,735 B2 | 6/2022 | Su et al. |
| 11,372,819 B1 | 6/2022 | Carter et al. |

(56) References Cited

U.S. PATENT DOCUMENTS

| | | |
|---|---|---|
| 11,435,901 B1 | 9/2022 | Chmiel et al. |
| 11,461,241 B2 | 10/2022 | Carpenter et al. |
| 11,461,286 B2 | 10/2022 | Godman et al. |
| 11,567,660 B2 | 1/2023 | Chmiel et al. |
| 11,599,508 B1 | 3/2023 | Harward et al. |
| 11,630,832 B2 | 4/2023 | Choi et al. |
| 11,669,255 B2 | 6/2023 | Hansen et al. |
| 11,722,150 B1 | 8/2023 | Fachan et al. |
| 11,729,269 B1 | 8/2023 | Meernik et al. |
| 11,734,147 B2 | 8/2023 | Bai et al. |
| 11,775,481 B2 | 10/2023 | Unger et al. |
| 11,921,677 B1 | 3/2024 | Kirby et al. |
| 11,934,660 B1 | 3/2024 | McMullan et al. |
| 11,966,592 B1 | 4/2024 | Bai |
| 12,019,875 B1 | 6/2024 | McMullan et al. |
| 12,038,877 B1 | 7/2024 | Kirby et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 | 5/2005 | Cassell et al. |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0182992 A1 | 8/2005 | Land et al. |
| 2005/0187992 A1 | 8/2005 | Prahlad et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0005297 A1 | 1/2007 | Beresniewicz et al. |
| 2007/0011302 A1 | 1/2007 | Groner et al. |
| 2007/0027985 A1 | 2/2007 | Ramany et al. |
| 2007/0061783 A1 | 3/2007 | Prakash |
| 2007/0100855 A1 | 5/2007 | T. Kohl |
| 2007/0106706 A1 | 5/2007 | Ahrens et al. |
| 2007/0118561 A1 | 5/2007 | Idicula et al. |
| 2007/0143371 A1 | 6/2007 | Kottomtharayil et al. |
| 2008/0028006 A1 | 1/2008 | Liu et al. |
| 2008/0059399 A1 | 3/2008 | Delorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0153560 A1 | 6/2011 | Bryant et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2011/0302357 A1 | 12/2011 | Sullivan |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0116478 A1 | 5/2012 | Buhlmann et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0031232 A1 | 1/2013 | Clymer et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0145471 A1 | 6/2013 | Richard et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1* | 1/2014 | Parkison ............... G06F 3/0635 707/661 |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189257 A1 | 7/2014 | Aritome |
| 2014/0189267 A1 | 7/2014 | Qi et al. |
| 2014/0195847 A1 | 7/2014 | Webman et al. |
| 2014/0237193 A1 | 8/2014 | Shivashankaraiah |
| 2014/0258609 A1 | 9/2014 | Cui et al. |
| 2014/0258657 A1 | 9/2014 | Schott et al. |

(56) References Cited

U.S. PATENT DOCUMENTS

| | | |
|---|---|---|
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0358356 A1 | 12/2014 | Jones et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012656 A1 | 1/2015 | Phillips et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186410 A1 | 7/2015 | Petculescu et al. |
| 2015/0186483 A1 | 7/2015 | Tappan et al. |
| 2015/0186527 A1 | 7/2015 | Rao et al. |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0278282 A1 | 10/2015 | Sardina et al. |
| 2015/0278329 A1 | 10/2015 | Hrle et al. |
| 2015/0310034 A1 | 10/2015 | Godman et al. |
| 2015/0310035 A1 | 10/2015 | Godman et al. |
| 2015/0310054 A1* | 10/2015 | Passey ............... G06F 16/2358 707/703 |
| 2015/0347126 A1 | 12/2015 | Tibble et al. |
| 2016/0034356 A1 | 2/2016 | Aron et al. |
| 2016/0034481 A1 | 2/2016 | Kumarasamy et al. |
| 2016/0071233 A1 | 3/2016 | Macko et al. |
| 2016/0110105 A1 | 4/2016 | Karamcheti et al. |
| 2016/0139836 A1 | 5/2016 | Nallathambi et al. |
| 2016/0139952 A1 | 5/2016 | Geng et al. |
| 2016/0147654 A1 | 5/2016 | Zhao et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0350363 A1* | 12/2016 | Raja ................... G06F 16/2343 |
| 2016/0357677 A1 | 12/2016 | Hooker et al. |
| 2016/0359859 A1 | 12/2016 | Capone |
| 2016/0371296 A1 | 12/2016 | Passey et al. |
| 2016/0371297 A1 | 12/2016 | Okun et al. |
| 2016/0380878 A1 | 12/2016 | Bugenhagen et al. |
| 2016/0380913 A1* | 12/2016 | Morgan ............... H04L 41/0654 709/226 |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0165300 A1 | 6/2018 | Okun et al. |
| 2018/0165321 A1 | 6/2018 | Taron et al. |
| 2018/0176082 A1 | 6/2018 | Katz et al. |
| 2018/0176120 A1 | 6/2018 | Katz et al. |
| 2018/0181583 A1 | 6/2018 | Godman |
| 2018/0203798 A1 | 7/2018 | Hughes et al. |
| 2018/0232386 A1 | 8/2018 | Brow et al. |
| 2018/0276078 A1 | 9/2018 | Blea et al. |
| 2018/0288057 A1 | 10/2018 | Varadamma et al. |
| 2018/0307579 A1 | 10/2018 | Rothchilds et al. |
| 2018/0314423 A1 | 11/2018 | Gong et al. |
| 2018/0357291 A1 | 12/2018 | Choi et al. |
| 2018/0365115 A1 | 12/2018 | Fang et al. |
| 2019/0087770 A1 | 3/2019 | Walsh et al. |
| 2019/0095112 A1 | 3/2019 | Lingarajappa |
| 2019/0102700 A1 | 4/2019 | Babu et al. |
| 2019/0163589 A1 | 5/2019 | Mcbride et al. |
| 2019/0163591 A1 | 5/2019 | Ouyang et al. |
| 2019/0196879 A1 | 6/2019 | Dutta et al. |
| 2019/0212921 A1 | 7/2019 | Liang et al. |
| 2019/0220189 A1 | 7/2019 | Yang et al. |
| 2019/0243818 A1 | 8/2019 | Taron et al. |
| 2019/0251065 A1 | 8/2019 | Passey et al. |
| 2019/0251066 A1 | 8/2019 | Okun et al. |
| 2019/0286521 A1 | 9/2019 | Okpotse et al. |
| 2019/0286528 A1 | 9/2019 | Wu et al. |
| 2019/0286543 A1 | 9/2019 | Rothschilds et al. |
| 2019/0294591 A1 | 9/2019 | Krasnow et al. |
| 2019/0332576 A1 | 10/2019 | Godman |
| 2019/0332579 A1 | 10/2019 | Cooper et al. |
| 2019/0377802 A1 | 12/2019 | Haber et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0034077 A1 | 1/2020 | Haravu et al. |
| 2020/0050391 A1 | 2/2020 | Meyerowitz et al. |
| 2020/0142878 A1 | 5/2020 | Varadarajan et al. |
| 2020/0174692 A1 | 6/2020 | Dave et al. |
| 2020/0201824 A1 | 6/2020 | Nishimoto et al. |
| 2020/0210385 A1 | 7/2020 | Carpenter et al. |
| 2020/0242075 A1 | 7/2020 | Davis et al. |
| 2020/0242082 A1 | 7/2020 | Chmiel et al. |
| 2020/0286270 A1 | 9/2020 | Lymperopoulos et al. |
| 2020/0341689 A1 | 10/2020 | Smith |
| 2020/0387315 A1 | 12/2020 | Sterns et al. |
| 2020/0409583 A1 | 12/2020 | Kusters et al. |
| 2021/0004355 A1 | 1/2021 | Iwase |
| 2021/0042263 A1 | 2/2021 | Zdornov et al. |
| 2021/0042282 A1 | 2/2021 | Cseri et al. |
| 2021/0056074 A1 | 2/2021 | Zhu |
| 2021/0110150 A1 | 4/2021 | Kakrana et al. |
| 2021/0117868 A1 | 4/2021 | Sriharsha |
| 2021/0173588 A1 | 6/2021 | Kannan et al. |
| 2021/0191650 A1 | 6/2021 | Vansteenkiste et al. |
| 2021/0232427 A1 | 7/2021 | Bai et al. |
| 2021/0232464 A1 | 7/2021 | Su et al. |
| 2021/0232481 A1 | 7/2021 | Bai et al. |
| 2021/0240393 A1 | 8/2021 | Jo et al. |
| 2021/0240678 A1 | 8/2021 | Patel et al. |
| 2021/0279187 A1 | 9/2021 | Puder et al. |
| 2021/0311841 A1 | 10/2021 | McNutt |
| 2021/0374105 A1 | 12/2021 | Kodama et al. |
| 2022/0019361 A1 | 1/2022 | Kurata et al. |
| 2022/0035716 A1 | 2/2022 | Su et al. |
| 2022/0035831 A1 | 2/2022 | Beers |
| 2022/0058055 A1 | 2/2022 | Amemiya et al. |
| 2022/0066882 A1 | 3/2022 | Wang et al. |
| 2022/0091739 A1 | 3/2022 | Kumar et al. |
| 2022/0100705 A1 | 3/2022 | Unger et al. |
| 2022/0107729 A1 | 4/2022 | Hua |
| 2022/0124152 A1 | 4/2022 | Gallego et al. |

(56) References Cited

U.S. PATENT DOCUMENTS

| | | |
|---|---|---|
| 2022/0138150 A1 | 5/2022 | Chmiel et al. |
| 2022/0283956 A1 | 9/2022 | Carpenter et al. |
| 2022/0300155 A1 | 9/2022 | Chmiel et al. |
| 2022/0300159 A1 | 9/2022 | Chmiel et al. |
| 2023/0004312 A1 | 1/2023 | Hansen et al. |
| 2023/0057068 A1 | 2/2023 | Bhandarkar et al. |
| 2023/0057600 A1 | 2/2023 | Malley et al. |
| 2023/0106208 A1 | 4/2023 | Nossenson et al. |
| 2023/0342053 A1 | 10/2023 | Varghese et al. |
| 2024/0020268 A1 | 1/2024 | Haber et al. |
| 2024/0028596 A1* | 1/2024 | Lakshman .......... G06F 16/2358 |

FOREIGN PATENT DOCUMENTS

| | | |
|---|---|---|
| EP | 3311312 A1 | 12/2016 |
| EP | 3333732 A1 | 6/2018 |
| EP | 3361397 A1 | 8/2018 |
| EP | 3361397 B1 | 11/2020 |
| EP | 3333732 B1 | 3/2023 |
| WO | 99/44145 A1 | 9/1999 |
| WO | 00/72201 A1 | 11/2000 |
| WO | 2009/007250 A2 | 1/2009 |
| WO | 2012/029259 A1 | 3/2012 |
| WO | 2016/205752 A1 | 12/2016 |
| WO | 2021/151107 A1 | 7/2021 |
| WO | 2021/189055 A2 | 9/2021 |

OTHER PUBLICATIONS

Office Communication for U.S. Appl. No. 18/070,705 mailed Jun. 20, 2023, 16 Pages.
Office Communication for U.S. Appl. No. 18/070,705 mailed Feb. 23, 2023, 14 Pages.
Office Communication for U.S. Appl. No. 17/062,500 mailed Feb. 27, 2023, 23 Pages.
Office Communication for U.S. Appl. No. 17/954,640 mailed Mar. 15, 2023, 9 Pages.
Office Communication for U.S. Appl. No. 17/864,190 mailed Apr. 28, 2023, 5 Pages.
Office Communication for U.S. Appl. No. 17/973,944 mailed May 10, 2023, 9 Pages.
Office Communication for U.S. Appl. No. 17/115,529 mailed May 22, 2023, 25 Pages.
Office Communication for U.S. Appl. No. 17/864,190 mailed Jan. 24, 2023, 12 Pages.
Office Communication for U.S. Appl. No. 17/588,120 mailed Feb. 1, 2023, 15 Pages.
Office Communication for U.S. Appl. No. 17/864,190 mailed Sep. 19, 2022, 10 Pages.
Office Communication for U.S. Appl. No. 17/062,500 mailed Oct. 5, 2022, 4 Pages.
Office Communication for U.S. Appl. No. 17/203,452 mailed Oct. 19, 2022, 9 Pages.
Office Communication for U.S. Appl. No. 17/588,120 mailed Oct. 21, 2022, 5 Pages.
Office Communication for U.S. Appl. No. 17/203,452 mailed Nov. 9, 2022, 2 Pages.
Office Communication for U.S. Appl. No. 17/588,895 mailed Nov. 9, 2022, 11 Pages.
Office Communication for U.S. Appl. No. 17/954,640 mailed Nov. 30, 2022, 10 Pages.
Office Communication for U.S. Appl. No. 17/115,529 mailed Dec. 9, 2022, 21 Pages.
Office Communication for U.S. Appl. No. 17/484,167 mailed May 17, 2022, 3 Pages.
Office Communication for U.S. Appl. No. 17/484,167 mailed Jun. 10, 2022, 5 Pages.
Office Communication for U.S. Appl. No. 17/203,452 mailed Jun. 22, 2022, 22 Pages.
Office Communication for U.S. Appl. No. 14/595,598 mailed Jul. 13, 2022, 9 Pages.
Office Communication for U.S. Appl. No. 17/062,500 mailed Jul. 26, 2022, 20 Pages.
Office Communication for U.S. Appl. No. 17/588,120 mailed Jul. 27, 2022, 34 Pages.
Office Communication for U.S. Appl. No. 17/190,653 mailed Aug. 2, 2022, 8 Pages.
Office Communication for U.S. Appl. No. 17/115,529 mailed Aug. 8, 2022, 21 Pages.
Office Communication for U.S. Appl. No. 17/588,895 mailed Aug. 12, 2022, 12 Pages.
Office Communication for U.S. Appl. No. 17/203,452 mailed Sep. 8, 2022, 4 Pages.
Office Communication for U.S. Appl. No. 17/504,289 mailed Mar. 28, 2022, 9 Pages.
Office Communication for U.S. Appl. No. 17/588,120 mailed Apr. 11, 2022, 36 Pages.
Office Communication for U.S. Appl. No. 17/588,895 mailed Apr. 27, 2022, 6 Pages.
Office Communication for U.S. Appl. No. 17/190,653 mailed Apr. 28, 2022, 13 Pages.
Office Communication for U.S. Appl. No. 17/510,043 mailed Apr. 29, 2022, 10 Pages.
Office Communication for U.S. Appl. No. 17/115,529 mailed Apr. 29, 2022, 4 Pages.
Office Communication for U.S. Appl. No. 17/190,653 mailed Dec. 21, 2021, 12 Pages.
Office Communication for U.S. Appl. No. 14/595,598 mailed Dec. 29, 2021, 19 Pages.
Office Communication for U.S. Appl. No. 17/062,500 mailed Jan. 7, 2022, 4 Pages.
Office Communication for U.S. Appl. No. 16/741,567 mailed Jan. 11, 2022, 6 Pages.
Office Communication for U.S. Appl. No. 17/203,452 mailed Jan. 14, 2022, 4 Pages.
Office Communication for U.S. Appl. No. 17/510,043 mailed Jan. 21, 2022, 13 Pages.
Office Communication for U.S. Appl. No. 16/741,567 mailed Feb. 7, 2022, 8 Pages.
Office Communication for U.S. Appl. No. 17/530,420 mailed Feb. 10, 2022, 24 Pages.
Office Communication for U.S. Appl. No. 16/004,182 mailed Feb. 18, 2022, 11 Pages.
Office Communication for U.S. Appl. No. 17/115,529 mailed Feb. 18, 2022, 20 Pages.
Office Communication for U.S. Appl. No. 17/203,452 mailed Feb. 24, 2022, 14 Pages.
Office Communication for U.S. Appl. No. 17/484,167 mailed Mar. 11, 2022, 11 Pages.
Office Communication for U.S. Appl. No. 17/062,500 mailed Mar. 22, 2022, 19 Pages.
Office Communication for U.S. Appl. No. 16/152,277 mailed Oct. 18, 2021, 5 Pages.
International Search Report and Written Opinion for International Patent Application No. PCT/US2021/023525 mailed Oct. 12, 2021, 6 Pages.
Office Communication for U.S. Appl. No. 17/115,529 mailed Oct. 22, 2021, 20 Pages.
Office Communication for U.S. Appl. No. 17/115,529 mailed Dec. 13, 2023, 4 Pages.
Office Communication for U.S. Appl. No. 17/115,529 mailed Jan. 12, 2024, 26 Pages.
Office Communication for U.S. Appl. No. 18/503,791 mailed Jan. 4, 2024, 27 Pages.
International Search Report and Written Opinion for International Patent Application No. PCT/US2021/023531 mailed Jul. 6, 2021, 6 Pages.
Office Communication for U.S. Appl. No. 17/062,500 mailed Jul. 12, 2021, 18 Pages.
Office Communication for U.S. Appl. No. 16/775,041 mailed Jul. 21, 2021, 11 Pages.

(56) References Cited

OTHER PUBLICATIONS

Office Communication for U.S. Appl. No. 17/114,384 mailed Aug. 3, 2021, 4 Pages.
Office Communication for U.S. Appl. No. 14/595,598 mailed Aug. 6, 2021, 20 Pages.
Office Communication for U.S. Appl. No. 17/115,529 mailed Aug. 12, 2021, 4 Pages.
Office Communication for U.S. Appl. No. 17/190,653 mailed Aug. 27, 2021, 11 Pages.
Office Communication for U.S. Appl. No. 17/114,384 mailed Sep. 2, 2021, 5 Pages.
Office Communication for U.S. Appl. No. 16/152,277 mailed Sep. 3, 2021, 4 Pages.
Office Communication for U.S. Appl. No. 16/004,182 mailed Sep. 10, 2021, 4 Pages.
Office Communication for U.S. Appl. No. 16/004,182 mailed Sep. 29, 2021, 11 Pages.
Office Communication for U.S. Appl. No. 17/491,017 mailed Dec. 23, 2021, 41 Pages.
Office Communication for U.S. Appl. No. 17/491,017 mailed May 12, 2022, 50 Pages.
Office Communication for U.S. Appl. No. 17/491,017 mailed Sep. 15, 2022, 55 Pages.
Office Communication for U.S. Appl. No. 17/491,017 mailed Feb. 10, 2023, 55 Pages.
Office Communication for U.S. Appl. No. 17/491,017 mailed Aug. 8, 2023, 13 Pages.
Office Communication for U.S. Appl. No. 14/595,598 mailed May 16, 2019, 18 Pages.
Office Communication for U.S. Appl. No. 16/152,277 mailed Oct. 26, 2021, 2 Pages.
Office Communication for U.S. Appl. No. 16/004,182 mailed Mar. 17, 2022, 3 Pages.
Office Communication for U.S. Appl. No. 16/226,587 mailed Jan. 27, 2020, 13 Pages.
Office Communication for U.S. Appl. No. 16/741,567 mailed Feb. 24, 2022, 2 Pages.
Office Communication for U.S. Appl. No. 16/234,334 mailed Oct. 11, 2019, 16 Pages.
Office Communication for U.S. Appl. No. 16/262,790 mailed Nov. 8, 2019, 5 Pages.
Office Communication for U.S. Appl. No. 17/504,289 mailed Apr. 20, 2022, 2 Pages.
Office Communication for U.S. Appl. No. 16/659,488 mailed May 6, 2020, 8 Pages.
International Preliminary Report on Patentability Chapter I for International Patent Application No. PCT/US2021/023531 mailed Aug. 4, 2022, 5 Pages.
International Preliminary Report on Patentability Chapter I for International Patent Application No. PCT/US2021/023525 mailed Aug. 4, 2022, 5 Pages.
International Preliminary Report on Patentability Chapter I for International Patent Application No. PCT/US2016/038242 mailed Dec. 28, 2017, 8 Pages.
Office Action for European Patent Application No. 17206518.7 mailed Mar. 15, 2022, 5 Pages.
Intention to Grant for European Patent Application No. 17206518.7 mailed Sep. 30, 2022, 6 Pages.
Office Communication for U.S. Appl. No. 17/508,869 mailed Mar. 8, 2022, 2 Pages.
Office Communication for U.S. Appl. No. 17/508,869 mailed Jan. 5, 2022, 3 Pages.
Office Communication for U.S. Appl. No. 17/508,869 mailed Dec. 22, 2021, 9 Pages.
Office Communication for U.S. Appl. No. 17/530,420 mailed May 4, 2022, 3 Pages.
Office Communication for U.S. Appl. No. 17/530,420 mailed May 12, 2022, 3 Pages.
Office Communication for European Patent Application No. 16812585.4 mailed Apr. 1, 2021, 9 pages.
Intention to Grant for European Patent Application No. 18155779.4 mailed Jun. 12, 2020, 10 Pages.
Office Communication for U.S. Appl. No. 17/115,529 mailed Sep. 12, 2023, 25 Pages.
Office Communication for U.S. Appl. No. 17/491,017 mailed May 4, 2023, 6 Pages.
Office Communication for U.S. Appl. No. 17/491,017 mailed Aug. 17, 2022, 5 Pages.
Office Communication for U.S. Appl. No. 17/864,190 mailed Aug. 25, 2023, 12 Pages.
Office Communication for U.S. Appl. No. 18/070,705 mailed Sep. 7, 2023, 5 Pages.
Office Communication for European Patent Application No. 18155779.4 mailed Apr. 17, 2018, 4 Pages.
Office Communication for U.S. Appl. No. 17/864,190 mailed Nov. 17, 2023, 12 Pages.
Office Communication for U.S. Appl. No. 17/062,500 mailed Oct. 27, 2021, 17 Pages.
Office Communication for U.S. Appl. No. 14/595,598 mailed Oct. 28, 2021, 6 Pages.
Office Communication for U.S. Appl. No. 16/741,567 mailed Oct. 28, 2021, 11 Pages.
Office Communication for U.S. Appl. No. 17/203,452 mailed Nov. 2, 2021, 13 Pages.
Office Communication for U.S. Appl. No. 17/190,653 mailed Nov. 10, 2021, 6 Pages.
Office Communication for U.S. Appl. No. 17/484,167 mailed Nov. 18, 2021, 15 Pages.
Office Communication for U.S. Appl. No. 17/504,289 mailed Dec. 7, 2021, 15 Pages.
Office Communication for U.S. Appl. No. 17/114,384 mailed Dec. 14, 2021, 7 Pages.
Office Communication for U.S. Appl. No. 16/226,587 mailed Aug. 5, 2019, 46 Pages.
Office Communication for U.S. Appl. No. 16/228,716 mailed Jun. 24, 2019, 10 Pages.
Office Communication for U.S. Appl. No. 16/231,354 mailed Jul. 10, 2019, 8 Pages.
Office Communication for U.S. Appl. No. 16/262,756 mailed Aug. 5, 2019, 35 Pages.
Office Communication for U.S. Appl. No. 15/967,499 mailed Jun. 27, 2018, 16 Pages.
Office Communication for U.S. Appl. No. 16/226,587 mailed Feb. 25, 2019, 43 Pages.
Office Communication for U.S. Appl. No. 16/228,716 mailed Feb. 28, 2019, 15 Pages.
Office Communication for U.S. Appl. No. 16/231,354 mailed Mar. 25, 2019, 10 Pages.
Office Communication for U.S. Appl. No. 16/262,756 mailed Apr. 2, 2019, 29 Pages.
Office Communication for U.S. Appl. No. 16/262,790 maned Aug. 23, 2019, 16 Pages.
Office Communication for U.S. Appl. No. 16/262,790 mailed Apr. 18, 2019, 14 Pages.
Office Communication for U.S. Appl. No. 16/262,756 mailed Oct. 25, 2019, 4 Pages.
Office Communication for U.S. Appl. No. 16/659,488 mailed Dec. 30, 2019, 6 Pages.
Office Communication for U.S. Appl. No. 14/595,598 mailed Dec. 31, 2019, 16 Pages.
Office Communication for U.S. Appl. No. 16/004,208 mailed Aug. 27, 2018, 11 Pages.
Office Communication for U.S. Appl. No. 16/234,395 mailed Aug. 8, 2019, 10 Pages.
Office Communication for U.S. Appl. No. 16/234,334 mailed Apr. 5, 2019, 15 Pages.
Office Communication for U.S. Appl. No. 16/234,395 mailed Mar. 28, 2019, 10 Pages.
Kappes, Giorgos et al., "Dike: Virtualization-awarn Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.

(56) References Cited

OTHER PUBLICATIONS

Office Communication for U.S. Appl. No. 15/473,051 mailed Jun. 30, 2017, 23 Pages.
Extended European Search Report for European Patent Application No. 18155779.4 mailed Apr. 17, 2018, 15 Pages.
Office Communication for U.S. Appl. No. 16/004,182 mailed Aug. 23, 2018, 43 Pages.
Office Communication for U.S. Appl. No. 16/004,182 mailed Mar. 5, 2019, 46 Pages.
Office Communication for U.S. Appl. No. 16/004,182 mailed Jul. 3, 2019, 45 Pages.
Office Communication for U.S. Appl. No. 15/694,604 mailed Jun. 3, 2019, 8 Pages.
Office Communication for U.S. Appl. No. 16/004,182 mailed May 22, 2019, 4 Pages.
Office Communication for U.S. Appl. No. 14/595,043 mailed May 4, 2017, 30 Pages.
Office Communication for U.S. Appl. No. 14/595,043 mailed Feb. 23, 2018, 16 Pages.
Office Communication for U.S. Appl. No. 14/595,043 mailed May 25, 2018, 7 Pages.
Office Communication for U.S. Appl. No. 14/595,043 mailed Oct. 5, 2018, 17 Pages.
Office Communication for U.S. Appl. No. 14/595,043 mailed Jun. 7, 2019, 19 Pages.
Office Communication for U.S. Appl. No. 14/595,043 mailed Aug. 27, 2019, 17 Pages.
Office Communication for U.S. Appl. No. 14/658,015 mailed Apr. 27, 2017, 7 Pages.
Office Communication for U.S. Appl. No. 14/658,015 mailed Jan. 4, 2018, 28 Pages.
Office Communication for U.S. Appl. No. 14/658,015 mailed Jul. 13, 2018, 8 Pages.
Office Communication for U.S. Appl. No. 14/859,061 mailed Sep. 22, 2017, 16 Pages.
Office Communication for U.S. Appl. No. 15/831,236 mailed Mar. 30, 2018, 8 Pages.
Office Communication for U.S. Appl. No. 15/831,236 mailed Aug. 15, 2018, 14 Pages.
Office Communication for U.S. Appl. No. 14/859,114 mailed Jul. 24, 2017, 41 Pages.
Office Communication for U.S. Appl. No. 14/859,114 mailed Feb. 21, 2018, 25 Pages.
Office Communication for U.S. Appl. No. 14/859,114 mailed May 11, 2018, 5 Pages.
Office Communication for U.S. Appl. No. 16/883,922 mailed Aug. 7, 2020, 13 Pages.
Office Communication for U.S. Appl. No. 16/775,041 mailed Aug. 18, 2020, 9 Pages.
Office Communication for U.S. Appl. No. 16/883,879 mailed Sep. 1, 2020, 11 Pages.
Extended European Search Report for European Patent Application No. 16812585.4 mailed Nov. 7, 2018, 9 Pages.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 mailed Jan. 2, 2020, 6 Pages.
International Search Report and Written Opinion for International Patent Application No. PCT/US2016/038242 mailed Oct. 11, 2016, 9 Pages.
Office Communication for U.S. Appl. No. 14/595,598 mailed Jul. 31, 2019, 5 Pages.
Office Communication for U.S. Appl. No. 14/595,598 mailed Sep. 20, 2018, 18 Pages.
Office Communication for U.S. Appl. No. 14/595,598 mailed Dec. 15, 2017, 18 Pages.
Office Communication for U.S. Appl. No. 14/595,598 mailed Feb. 24, 2017, 8 Pages.
Office Communication for U.S. Appl. No. 14/595,598 mailed Apr. 19, 2018, 5 Pages.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 mailed Aug. 24, 2020, 7 Pages.
Office Communication for European Patent Application No. 18155779.4 mailed Oct. 8, 2019, 4 Pages.
Office Communication for U.S. Appl. No. 16/152,259 mailed Aug. 28, 2020, 5 Pages.
Office Communication for U.S. Appl. No. 16/752,509 mailed Aug. 11, 2020, 7 Pages.
Office Communication for U.S. Appl. No. 14/595,598 mailed Sep. 25, 2020, 7 Pages.
Office Communication for U.S. Appl. No. 16/152,277 mailed Oct. 16, 2020, 10 Pages.
Office Communication for U.S. Appl. No. 16/152,615 mailed Oct. 20, 2020, 7 Pages.
Office Communication for U.S. Appl. No. 16/775,041 mailed Nov. 3, 2020, 5 Pages.
Office Communication for U.S. Appl. No. 17/062,500 mailed Nov. 12, 2020, 12 Pages.
Office Communication for U.S. Appl. No. 16/004,182 mailed Nov. 30, 2020, 55 Pages.
Office Communication for U.S. Appl. No. 14/859,114 mailed Dec. 1, 2020, 24 Pages.
Office Communication for U.S. Appl. No. 16/883,922 mailed Dec. 2, 2020, 9 Pages.
Office Communication for U.S. Appl. No. 16/883,879 mailed Dec. 8, 2020, 5 Pages.
Office Communication for U.S. Appl. No. 16/152,277 mailed Dec. 28, 2020, 5 Pages.
Office Communication for U.S. Appl. No. 16/004,182 mailed Jan. 28, 2021, 4 Pages.
Office Communication for U.S. Appl. No. 14/595,598 mailed Feb. 4, 2021, 19 Pages.
Office Communication for U.S. Appl. No. 17/115,529 mailed Feb. 8, 2021, 15 Pages.
Office Communication for U.S. Appl. No. 16/262,756 mailed Feb. 10, 2021, 19 Pages.
Office Communication for U.S. Appl. No. 17/114,384 mailed Feb. 17, 2021, 12 Pages.
Office Action for European Patent Application No. 17206518.7 mailed Feb. 23, 2021, 6 Pages.
Office Communication for U.S. Appl. No. 14/859,114 mailed Mar. 8, 2021, 4 Pages.
Office Communication for U.S. Appl. No. 16/004,182 mailed Mar. 8, 2021, 60 Pages.
Office Communication for U.S. Appl. No. 17/062,500 mailed Mar. 9, 2021, 17 Pages.
Office Communication for U.S. Appl. No. 16/152,277 mailed Mar. 18, 2021, 10 Pages.
Office Communication for U.S. Appl. No. 17/160,698 mailed Mar. 18, 2021, 11 Pages.
Office Communication for U.S. Appl. No. 17/062,500 mailed May 18, 2021, 4 Pages.
Office Communication for U.S. Appl. No. 17/203,371 mailed May 20, 2021, 10 Pages.
Office Communication for U.S. Appl. No. 17/115,529 mailed May 25, 2021, 18 Pages.
Office Communication for U.S. Appl. No. 14/859,114 mailed May 26, 2021, 11 Pages.
Office Communication for U.S. Appl. No. 16/262,756 mailed May 27, 2021, 7 Pages.
Office Communication for U.S. Appl. No. 17/114,384 mailed May 27, 2021, 13 Pages.
Office Communication for U.S. Appl. No. 17/190,653 mailed May 27, 2021, 11 Pages.
Office Communication for U.S. Appl. No. 16/741,567 mailed Jun. 8, 2021, 5 Pages.

(56) References Cited

OTHER PUBLICATIONS

Office Communication for U.S. Appl. No. 17/203,452 mailed Jun. 23, 2021, 11 Pages.
Office Communication for U.S. Appl. No. 16/152,277 mailed Jun. 25, 2021, 10 Pages.
Office Communication for U.S. Appl. No. 16/004,182 mailed Jul. 1, 2021, 58 Pages.
Office Communication for U.S. Appl. No. 17/160,698 mailed Jul. 2, 2021, 12 Pages.
Office Communication for U.S. Appl. No. 14/859,114 mailed Jun. 27, 2018, 33 pages.
Office Communication for U.S. Appl. No. 14/859,114 mailed Nov. 19, 2018, 35 Pages.
Office Communication for U.S. Appl. No. 14/859,114 mailed Jan. 31, 2019, 4 Pages.
Office Communication for U.S. Appl. No. 14/859,114 mailed Mar. 7, 2019, 32 Pages.
Office Communication for U.S. Appl. No. 14/859,114 mailed Jun. 26, 2019, 21 Pages.
Office Communication for U.S. Appl. No. 14/859,114 mailed Sep. 13, 2019, 6 Pages.
Office Communication for U.S. Appl. No. 14/859,114 mailed Nov. 26, 2019, 21 Pages.
Office Communication for U.S. Appl. No. 15/288,853 mailed Sep. 19, 2018, 13 pages.
Office Communication for U.S. Appl. No. 15/288,853 mailed Mar. 25, 2019, 25 Pages.
Office Communication for U.S. Appl. No. 16/436,825 mailed Jul. 11, 2019, 9 Pages.
Office Communication for U.S. Appl. No. 15/474,047 mailed Sep. 18, 2017, 14 Pages.
Office Communication for U.S. Appl. No. 15/474,047 mailed Mar. 9, 2018, 8 Pages.
Office Communication for U.S. Appl. No. 15/474,047 mailed Jun. 11, 2018, 6 Pages.
Office Communication for U.S. Appl. No. 15/474,047 mailed Aug. 15, 2018, 11 Pages.
Office Communication for U.S. Appl. No. 15/957,809 mailed Jun. 28, 2018, 27 Pages.
Office Communication for U.S. Appl. No. 15/957,809 mailed Jan. 24, 2019, 11 Pages.
Office Communication for U.S. Appl. No. 16/434,157 mailed Jul. 25, 2019, 8 Pages.
Office Communication for U.S. Appl. No. 15/854,447 mailed May 6, 2019, 9 Pages.
Office Communication for U.S. Appl. No. 16/505,562 mailed Aug. 30, 2019, 11 Pages.
Extended European Search Report for European Patent Application No. 17206518.7 mailed Apr. 5, 2018, 8 Pages.
Office Communication for U.S. Appl. No. 16/004,182 mailed Jan. 7, 2020, 46 Pages.
Office Communication for U.S. Appl. No. 16/125,573 mailed Nov. 21, 2019, 13 Pages.
Office Communication for U.S. Appl. No. 16/226,587 mailed Oct. 24, 2019, 4 Pages.
Office Communication for U.S. Appl. No. 16/262,790 mailed Dec. 12, 2019, 10 Pages.
Office Communication for U.S. Appl. No. 16/234,334 mailed Jan. 16, 2020, 8 Pages.
Office Communication for U.S. Appl. No. 15/694,604 mailed Nov. 20, 2019, 8 Pages.
Office Communication for U.S. Appl. No. 16/262,756 mailed Jan. 28, 2020, 21 Pages.
Office Communication for U.S. Appl. No. 16/434,157 mailed Jan. 29, 2020, 9 Pages.
Office Communication for U.S. Appl. No. 16/262,790 mailed Feb. 6, 2020, 8 Pages.
Office Communication for U.S. Appl. No. 14/859,114 mailed Mar. 13, 2020, 21 Pages.
Office Communication for U.S. Appl. No. 16/752,451 mailed Mar. 12, 2020, 14 Pages.
Office Communication for U.S. Appl. No. 16/775,041 mailed Mar. 11, 2020, 8 pages.
Office Communication for U.S. Appl. No. 16/779,362 mailed Mar. 26, 2020, 10 Pages.
Office Communication for U.S. Appl. No. 16/004,182 mailed Mar. 23, 2020, 4 Pages.
Office Communication for U.S. Appl. No. 16/752,509 mailed Apr. 2, 2020, 8 Pages.
Office Communication for U.S. Appl. No. 16/152,277 mailed Apr. 3, 2020, 10 Pages.
Office Communication for U.S. Appl. No. 16/004,182 mailed Apr. 28, 2020, 51 Pages.
Office Communication for U.S. Appl. No. 16/152,259 mailed Apr. 29, 2020, 19 Pages.
Office Communication for U.S. Appl. No. 14/859,114 mailed Jun. 5, 2020, 5 Pages.
Office Communication for U.S. Appl. No. 16/262,756 mailed Jun. 8, 2020, 22 Pages.
Office Communication for U.S. Appl. No. 14/595,598 mailed Jul. 9, 2020, 19 Pages.
Office Communication for U.S. Appl. No. 16/752,451 mailed Jul. 23, 2020, 8 Pages.
Office Communication for U.S. Appl. No. 14/859,114 mailed Jul. 23, 2020, 21 Pages.
Office Communication for U.S. Appl. No. 16/152,615 mailed Aug. 6, 2020, 7 Pages.
Office Communication for U.S. Appl. No. 16/779,362 mailed Aug. 7, 2020, 11 Pages.
Office Communication for U.S. Appl. No. 16/883,992 mailed Aug. 7, 2020, 13 Pages.
Office Communication for U.S. Appl. No. 17/864,190 mailed Feb. 8, 2024, 5 Pages.
Office Communication for U.S. Appl. No. 18/503,918 mailed Jan. 24, 2024, 12 Pages.
Office Communication for U.S. Appl. No. 18/503,918 mailed Jan. 31, 2024, 8 Pages.
Chimera, Richard, "Value Bars: An Information Visualization and Navigation Tool for Multi-attribute Listings", CHI '92, Monterey, CA, May 3-7, 1992, pp. 293-294.
Cudre-Mauroux, Philippe et al, "TrajStore An Adaptive Storage System for Very Lar ie Trajectoly Sets", ICDE 2010, Long Beach, CA, Mar. 1-6, 2010, pp. 109-120.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Wikipedia clustered file system page from elate Jul. 9, 2019, retrieved using the WayBackMachine, From https//web.archive.org/web/20190709083400/tlhttps://en.wikipedia.org/wiki/Clustered_file_system (Year: 2019), pp. 1-6.
Wikipedia raft page from date Jul. 16, 2019, retrieved using the WayBackMachine, from tlhttps://web.archive.org/web/20190716115001/ https://en.wikipedia.org/wiki/Raft (computer_science) (Year: 2019), pp. 1-4.
Office Communication for U.S. Appl. No. 18/070,705 mailed Feb. 22, 2024, 7 Pages.
Office Communication for U.S. Appl. No. 18/070,705 mailed Mar. 5, 2024, 2 Pages.
Office Communication for U.S. Appl. No. 17/115,529 mailed Mar. 26, 2024, 27 Pages.
Office Communication for U.S. Appl. No. 18/583,746 mailed May 14, 2024, 21 Pages.
Office Communication for U.S. Appl. No. 18/590,088 mailed Apr. 24, 2024, 18 Pages.
Office Communication for U.S. Appl. No. 18/590,088 mailed May 2, 2024, 13 Pages.
Office Communication for U.S. Appl. No. 17/864,190 mailed Jun. 4, 2024, 12 Pages.

(56) References Cited

OTHER PUBLICATIONS

Marcus Jurgens, "Aggregated Data in Tree-Based Index Structures" in Index Structures for Data Warehouses, LNCS 1859, Springer, Year: 2002, pp. 43-62.

* cited by examiner

OBJECT-BASED STORAGE WITH GARBAGE COLLECTION AND DATA CONSOLIDATION

TECHNICAL FIELD

The present invention relates generally to file systems, and more particularly, but not exclusively, to object-based storage with garbage collection and data consolidation.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Further, reliable or highly-available file systems may be expected to perform various actions to operate, recover from errors, perform backups, rebalancing data, or the like, that may consume significant system bandwidth. Further, often contemporary distributed file systems may be implemented in various cloud computing environments. In some cases, cloud computing environments provided by different cloud computing providers may require specialized handling adapted to particular features or characteristics of a given cloud computing environment. Failure to adapt file system operations to particular cloud computing environment characteristics may result in disadvantageous cost or performance impacts. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
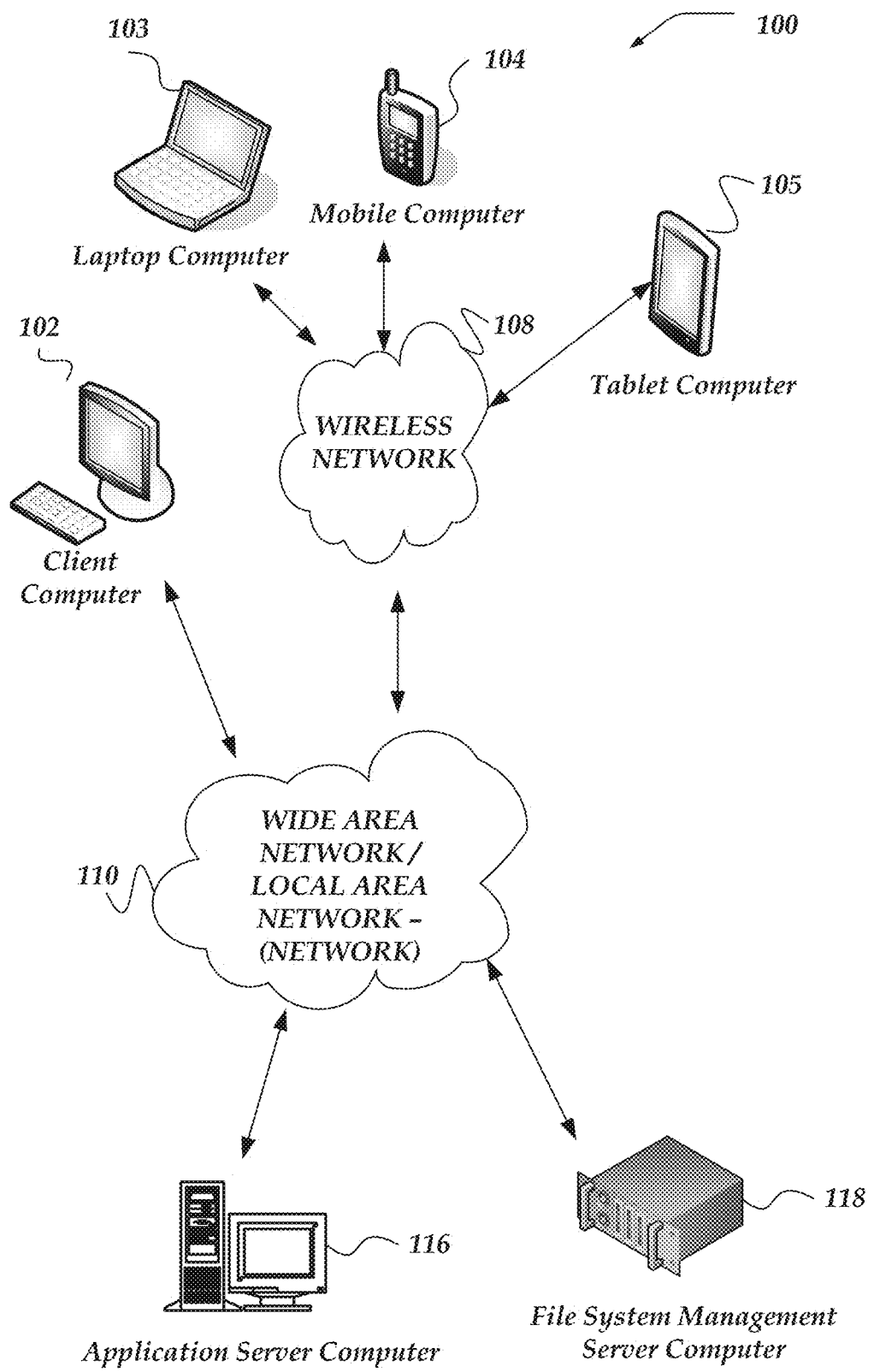
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

As used herein the terms "data block," "file system block," refer to the portions of data used to store data in a file system. For example, small sized items such as, directories or small files may be comprised of a single block. Whereas larger files, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), cloud-based block storage, or the like. However, files or other items stored in file systems may be of various sizes, comprised of the number of blocks necessary to represent or contain the data or meta-data for the item.

As used herein the terms "write-ahead log,", or "WAL" refer to data structures for providing persistent records to support atomicity and durability in file systems, databases, or other data stores. Typically, a file system action may be considered "persisted" if the information or actions associated with the actions are recorded to persistent storage in a corresponding WAL. In some cases, WALs may be configured to record meta-data associated with file system actions rather than storing the payload data in the WAL. In general, organization/operational policies may determine which file system actions or which data is recorded in a given WAL.

As used herein the terms "write-ahead log block," or "WAL block" refer to data structures that represent a portion of a write-ahead log. Write-ahead log blocks may include meta-data that links them to subsequent blocks that comprise the write-ahead log. Write-ahead log blocks may include meta-data for managing the write-ahead log or other file system accounting/administration. Also, write-ahead log blocks may include or reference a list of transactions and associated data blocks if any.

As used herein the term "block storage" refers to storage device or storage system that stores or manages data using data block-level protocols that enable data to be accessed referenced in terms of fixed size portions. Block storage typically supports random access and often may provide a (in some cases modifiable) fixed capacity. Cloud computing providers may provide one or more block storage services for managing data in a cloud computing environment.

As used herein the term "object store" refers to a storage system that stores or manages data using objects. Objects may be individually sized based on the amount of data they are holding. In most cases, objects in object stores may be considered immutable such that updating a portion of the data included in an object may require the entire object to be replaced in the object store.

As used herein the term "WAL entry" refers to a data structure that includes modifications to one or more file system data blocks, where the modifications may be write, overwrite, delete, or the like.

As used herein the term "WAL object" refers to an object that includes one or more WAL entries. WAL objects may be stored in object stores using object identifiers that distinguish them from other types of objects. A WAL object may not contain any file system data if all the modifications in the WAL entries included are deletes and other non-data modifying operations.

As used herein the term "data object" refers to an object that is a WAL object that contains file system data but no longer has an associated WAL block due to a successful checkpoint. Data objects may be stored in object stores using object identifiers that distinguish them from other types of objects.

As used herein the term "index object" refers to an object that includes index entries that map data block addresses to data objects in the object store. Index objects may be stored in object stores using object identifiers that distinguish them from other types of objects.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to object-based storage with garbage collection and data consolidation. In one or more of the various embodiments, an object store for one or more write requests provided by a file system client may be determined based on the file system such that each write request may include one or more data blocks associated with a write transaction.

In one or more of the various embodiments, one or more write ahead log (WAL) entries that include the one or more data blocks may be generated.

In one or more of the various embodiments, a WAL object may be generated based on the one or more WAL entries.

In one or more of the various embodiments, the WAL object may be stored in the object store.

In one or more of the various embodiments, an in-memory overlay may be updated to associate the one or more data blocks with the WAL object.

In one or more of the various embodiments, a threshold for a number of WAL objects stored in the object store may be employed to initiate a checkpoint operation that performs further actions, including: generating an index object that includes one or more index entries that associate one or more other data blocks with one or more data objects stored in the object store; updating the index object to include one or more index entries that associate the one or more data blocks with the WAL object; storing the updated index object in the object store; updating the in-memory overlay to remove the association of the one or more data blocks and the WAL object; updating the in-memory WAL to remove records of successfully checkpointed WAL objects; sending an acknowledgement to the file system that the one or more data blocks are locally committed in the object store; or the like.

In one or more of the various embodiments, a portion of a page cache that includes a copy of the one or more data blocks may be invalidated.

In one or more of the various embodiments, the object store for one or more read requests provided by the file system client may be provided based on the file system such that each read request includes address information for one or more read data blocks associated with a read transaction. In some embodiments, the in-memory index may be employed to determine a data object in the object store that includes the one or more read data blocks. In some embodiments, the determined data object may be loaded from the object store. In some embodiments, the one or more read data blocks in the loaded data object may be determined based on the address information. In some embodiments, a response to the file system client that includes a copy of the one or more read data blocks may be sent.

In one or more of the various embodiments, the object store for one or more read requests provided by the file system client may be determined based on the file system, wherein each read request includes address information for one or more read data blocks associated with a read transaction. In some embodiments, the in-memory overlay may be employed to determine a WAL object in the object store that includes the one or more read data blocks. In some embodiments, the determined WAL object may be loaded from the object store. In some embodiments, the one or more read data blocks in the loaded WAL object may be determined based on the address information. In some embodiments, a response to the file system client that includes a copy of the one or more read data blocks may be sent.

In one or more of the various embodiments, an amount of waste data stored in the object store may be determined based on one or more metrics. In some embodiments, a garbage collection operation may be initiated based on one or more of the amount of waste data and a cost to store the waste space in the object store exceeding another cost of executing the garbage collection operation. In some embodiments, one or more fragmented data objects in the object store that include the waste data may be determined based on the one or more reference counters. In some embodiments, one or more consolidated data objects that exclude the waste data may be determined based on the one or more fragmented data objects. In some embodiments, the one or more consolidated data objects may be stored in the object store. In some embodiments, a current index object may be loaded from the object store. In some embodiments, a modified index object may be generated based on the current index object and the one or more consolidated data objects such that the modified index object is stored in the object store. In some embodiments, the one or more fragmented data objects and the current index object may be removed from the object store.

In one or more of the various embodiments, the one or more data objects may include an index block in each data object that references a location of each data block included in the one or more data objects such that the index block may be located at the beginning of the one or more data objects.

In one or more of the various embodiments, executing a checkpoint operation may include: determining one or more globally committed WAL objects that may correspond to one or more committed write transactions; determining one or more locally committed WAL objects that may be associated with one or more uncommitted write transactions; excluding the one or more locally committed WAL objects from the checkpoint operation; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 is described in more detail below in conjunction with FIG. 3. Although FIG. 1 illustrates file system management server computer 118, or the like, each as a single computer, the innovations or embodiments are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
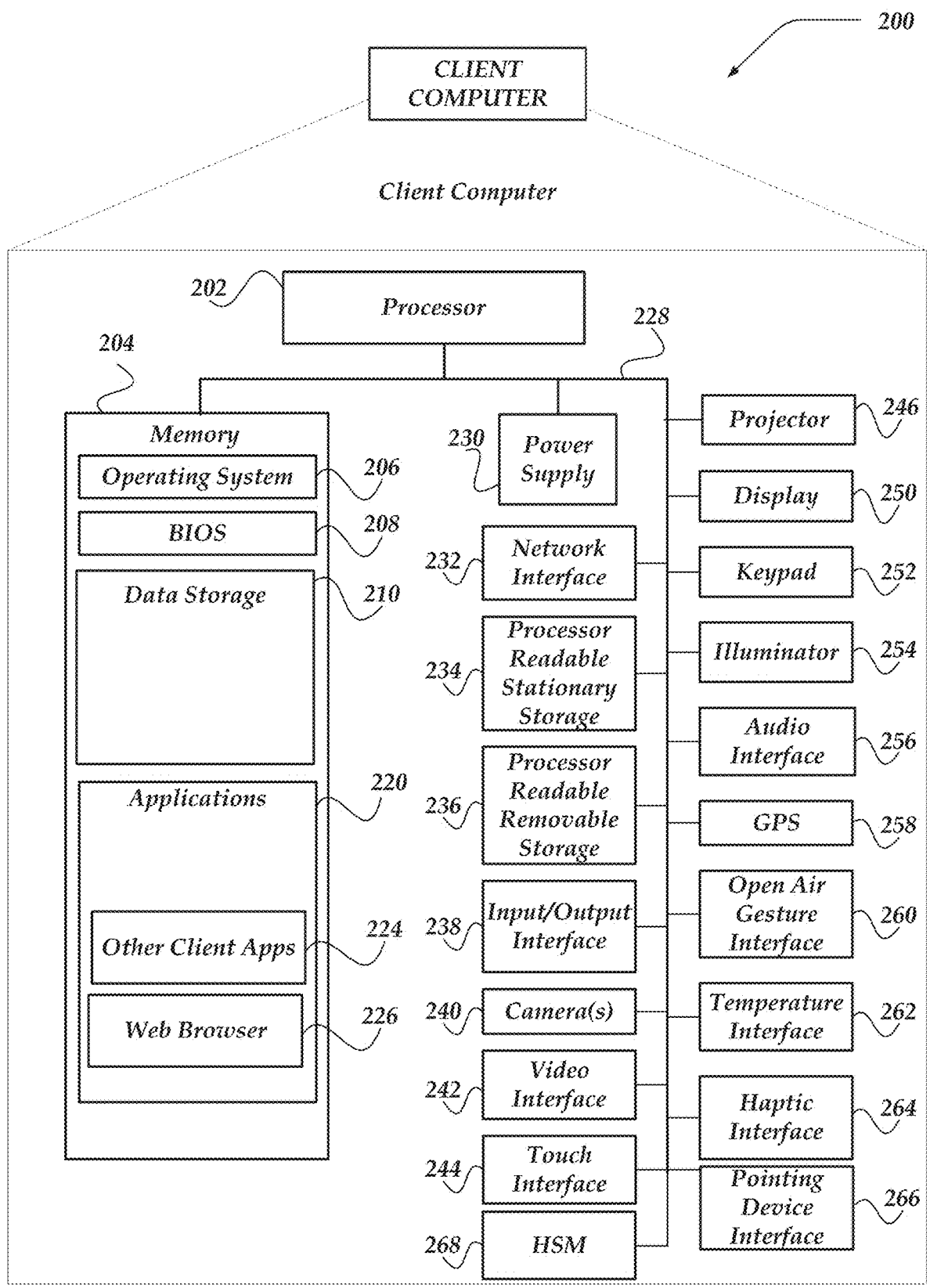
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measure or maintain an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications with one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic 16 to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
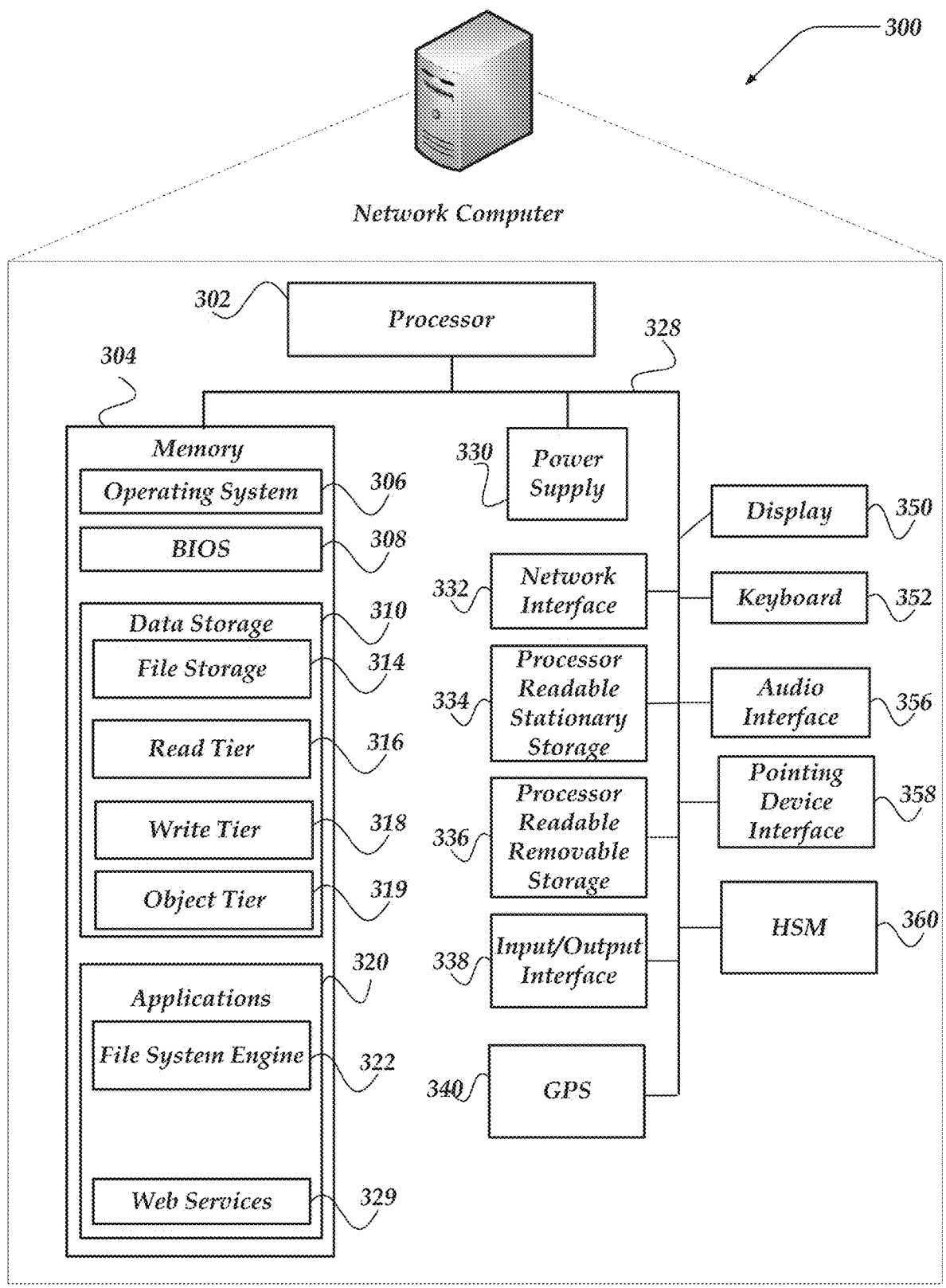
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, read tier 316, write tier 318, object tier 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, web services 329, or the like, may be provisioned and de-commissioned automatically.

Also, in one or more of the various embodiments, file system engine 322, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
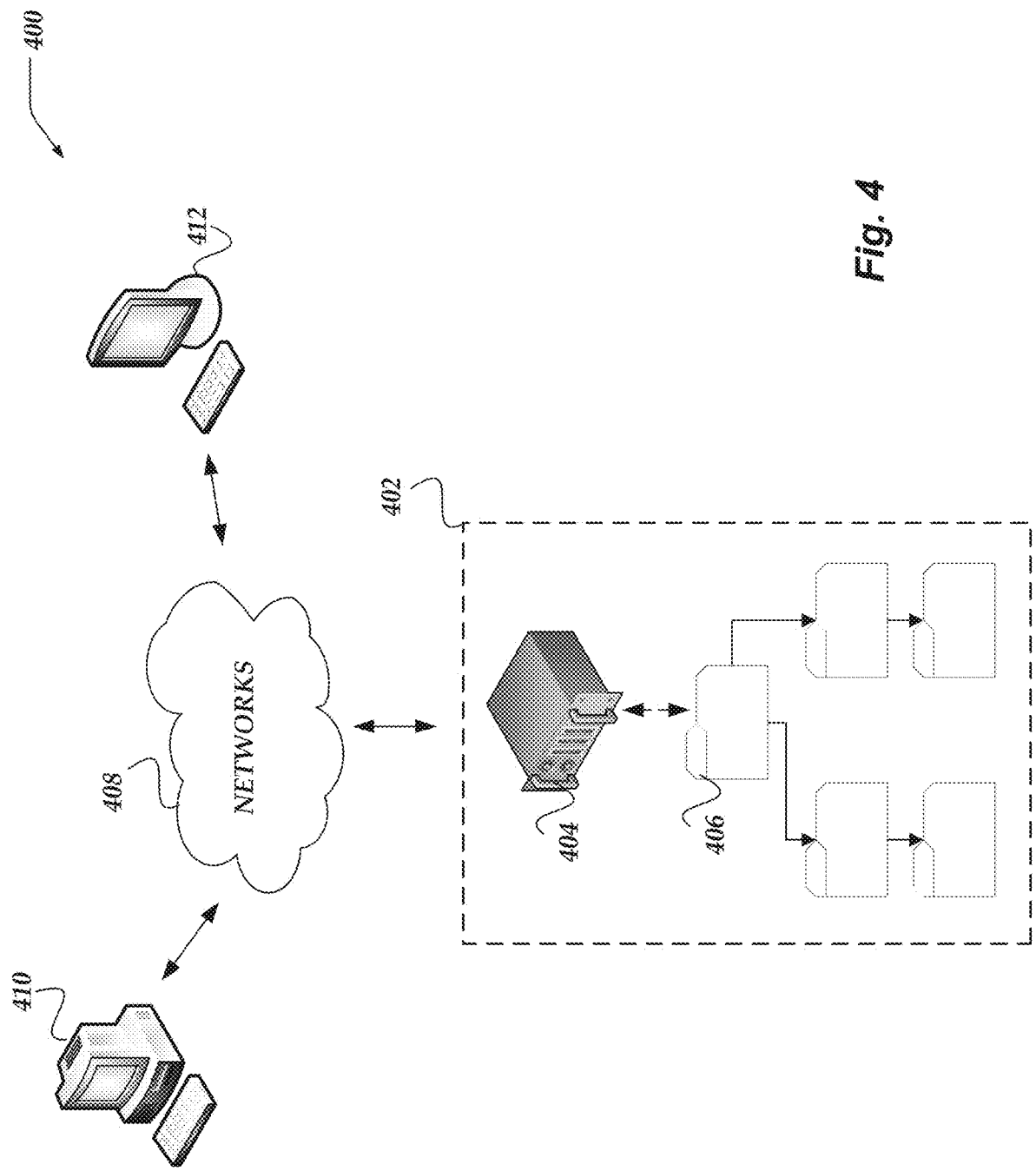
FIG. 4 illustrates a logical architecture of a system for object-based storage with garbage collection and data consolidation in accordance with one or more of the various embodiments.

FIG. 4 illustrates a logical architecture of system 400 for object-based storage with garbage collection and data consolidation in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, or deleting data (e.g., files, directories, documents, file system metadata, or the like) that may be stored in file system 402.

In some embodiments, file system 402 may comprise one or more file system management computers, such as file system management computer 404. Also, in one or more of the various embodiments, file systems, such as file system 402 may include one or more file system items, such as item 406. In one or more of the various embodiments, item 406 may be considered to represent the various file system items, such as, documents, files, or the like, that may be stored in file system 402. In some embodiments, file system items may include, files, documents, directories, folders, backups, snapshots, replication snapshots, replication information, or the like. In some embodiments, some file system items may be comprised of smaller file system items. Accordingly, in some embodiments, blocks or data blocks may be considered to be smallest file system items that comprise other more complex file system items, such as, files, documents, or the like.

In some embodiments, file system management computers may be automatically selected from among the one or more cluster nodes in a distributed file system rather than being reserved to a particular computer or cluster node. Accordingly, in some embodiments, if a file system management computer may be needed, cluster nodes may be arranged to elect a file system management computer from among their peer nodes.

In one or more of the various embodiments, the implementation details that enable file system 402 to provide file system services may be hidden from clients, such that they may use file system 402 the same way they use other conventional local or remote file systems. Accordingly, in one or more of the various embodiments, clients may be unaware that they are using a distributed file system that supports object-based storage with garbage collection and data consolidation because file system engines may be arranged to mimic the interface or behavior of one or more conventional file systems.

Also, while file system 402 is illustrated as using one file system management computer with one set of file system items, these innovations are not so limited. Innovations herein contemplate file systems that may include one or more file system management computers or one or more file system item data stores. In some embodiments, file system items may be located remotely from one or more file system management computers. Also, in some embodiments, file systems may be spread across cloud computing environments, storage clusters, or the like.

Figure 5:
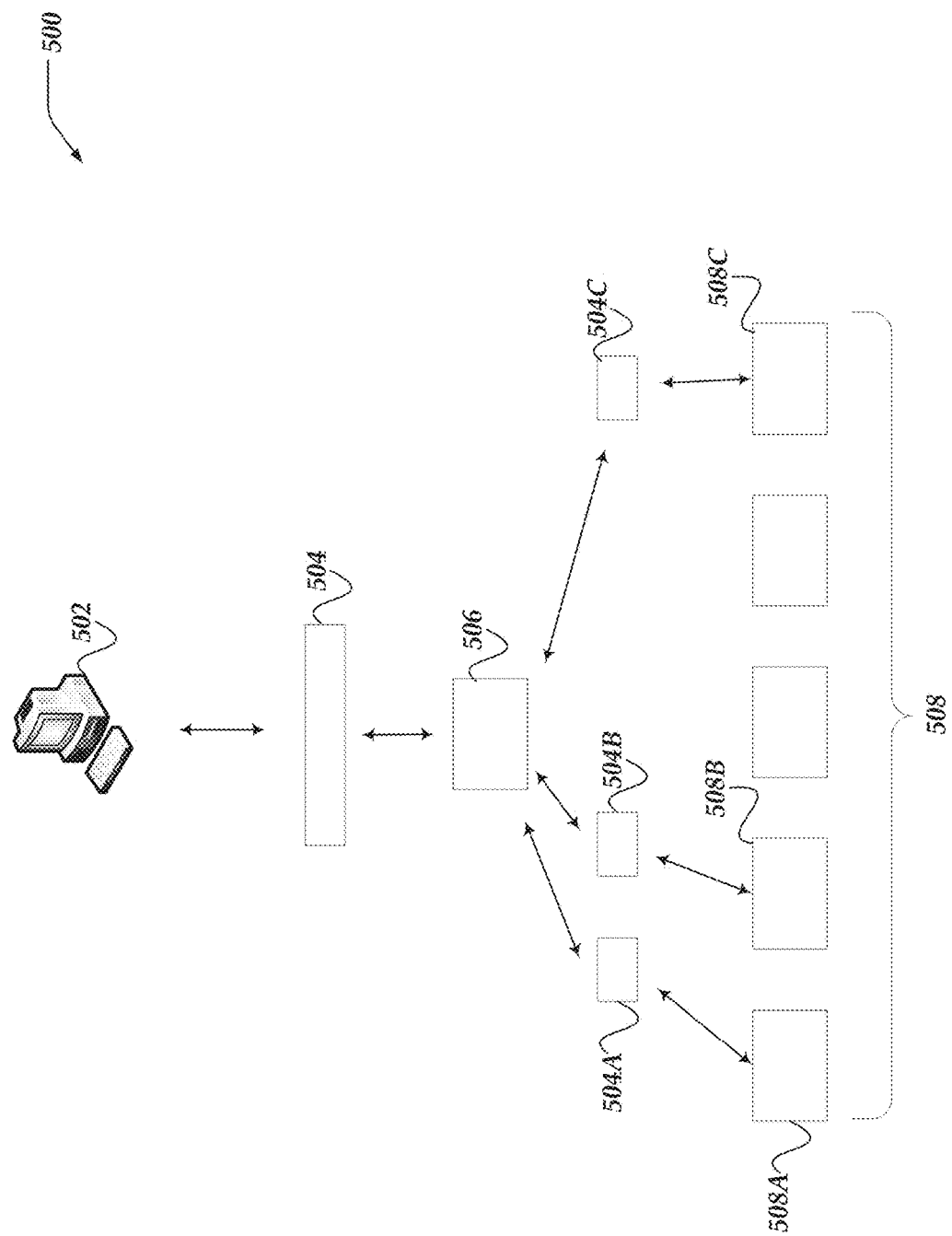
FIG. 5 illustrates a logical schematic of a file system for object-based storage with garbage collection and data consolidation in accordance with one or more of the various embodiments.

FIG. 5 illustrates a logical schematic of file system 500 for object-based storage with garbage collection and data consolidation in accordance with one or more of the various embodiments. FIG. 5 is provided to help illustrate how file system-wide command transactions may be broken down into parts (e.g., requests) that may be distributed to different nodes or protection stores in distributed file systems. Note, in this example, a protection store may be considered a portion of addressable file system storage that may be available in a file system. In some embodiments, each protection store may represent a portion of the address space of a given file system. In some embodiments, protection stores may be allocated or distributed according to one or more data protection schemes, striping schemes, RAID configurations, or the like, that may provide a desired level of data protection, performance, high-availability, or the like, that may vary depending on the given file system.

In some embodiments, file system clients, may be enabled to issue various file system commands (e.g., read file, remove file, save file, or the like) to a file system engine that may initiate one or more command transactions. Accordingly, in some embodiments, file system engines may be arranged to determine which portion of the command transaction may be satisfied by various nodes or protection stores in the greater file system. In some embodiments, portions of the command transaction may be provided to designated nodes or protection stores as directed by file system engines as read requests or write requests. In some embodiments, if each request associated with a command transaction may be completed, the command transaction may be considered committed. Similarly, in some embodiments, if one or more requests (portions of the command transaction) fail to commit locally in their designated node or protection store, the other requests associated with the same command transaction that may have locally succeeded may be rolled back.

In this example, for some embodiments, file system client 502 may submit a file system command to file system engine 506 that initiates a command transaction, such as, as transaction 504. In practice, command transaction 504 may be a read transaction or a write transaction. Accordingly, in some embodiments, read transactions may be directed to reading file system items (e.g, files, documents, directory listings, or the like) from the file system. Likewise, in some embodiments, write transactions may be providing data to be stored as file system items in the file system, modifying existing file system items, or deleting existing file system items.

In some embodiments, file system engines, such as file system engine 506 may receive transaction 504. Accordingly, in some embodiments, file system engine 506 may be arranged to divide the transaction across one or more protection stores, cluster nodes, or the like. Note, different file systems may employ different or distinct strategies for data protection, parallelism, high-availability, or the like, that may influence how the work or data for command transactions may be distributed in a file system. Thus, for brevity, details of these various strategies are omitted here.

In this example, for some embodiments, request 504A, request 504B, and request 504C may represent portions of command transaction 504 that may be distributed to different nodes or protection stores in a file system.

Accordingly, in some embodiments, nodes/protection stores 508 may be provided requests that may be part of the larger command transaction. In this example, for some embodiments, node/protection store 508A, node/protection store 508B, and node/protection store 508C may be selected for servicing the requests that make up command transaction 504.

In some cases, for some embodiments, nodes/protection stores may receive read requests that may be requesting one or more data blocks as defined by file system addresses, address ranges, or the like. Accordingly, in some embodiments, the nodes/protection stores may be arranged to locate and load the data blocks for the read requests they may be directed to service. These data blocks may be returned to contribute to completing the entire read transaction. In some embodiments, if each read request completes successfully, the read transaction may be considered successful and the data blocks provided for the read requests may be returned to the calling client.

Similarly, some requests may be write requests for a write command transaction. Accordingly, in some embodiments, each write request may include one or more data blocks to store at the determined node/protection store. Also, in some embodiments, delete operations may be considered write requests. However, delete requests may include information about which data blocks are to be deleted rather than including the data blocks themselves. If each write request succeeds the write transaction may be considered successful. Accordingly, the file system may provide an acknowledgment to the file system client that the write transaction completed successfully. In some embodiments, if one or more of the write requests fail, the write transaction may be considered failed. Accordingly, in some embodiments, any associated successful write requests associated with the failed transaction may be determined and rolled back.

Further, in some embodiments, each single node may include or be associated with multiple disks, cloud-based block storage devices, object stores, or the like. Thus, in some cases, multiple protection stores may be allocated on the same node such that the separate protection stores may be distributed across different storage systems (e.g., disks, cloud-based block storage, objects, or the like) associated with the single node.

Note, in some embodiments, file systems may be arranged to include a single node/protection store such that each transaction may essentially be considered a request.

For brevity and clarity, innovations disclosed herein are generally described in the context of a single node/protection store that is handling read requests or write requests that may be part of larger read transaction or write transaction. Accordingly, in some embodiments, mechanisms, such as those associated with allocating protection stores across a file system, data protection (e.g., erasure coding), encryption, rebalancing of data stored in a file system, routing requests, dividing transactions into requests, or the like, are omitted. One of ordinary skill in the art will appreciate that disclosures herein are at least sufficient for integrating the disclosed and recited innovations into a wide variety of file systems or file system architectures.

Figure 6:
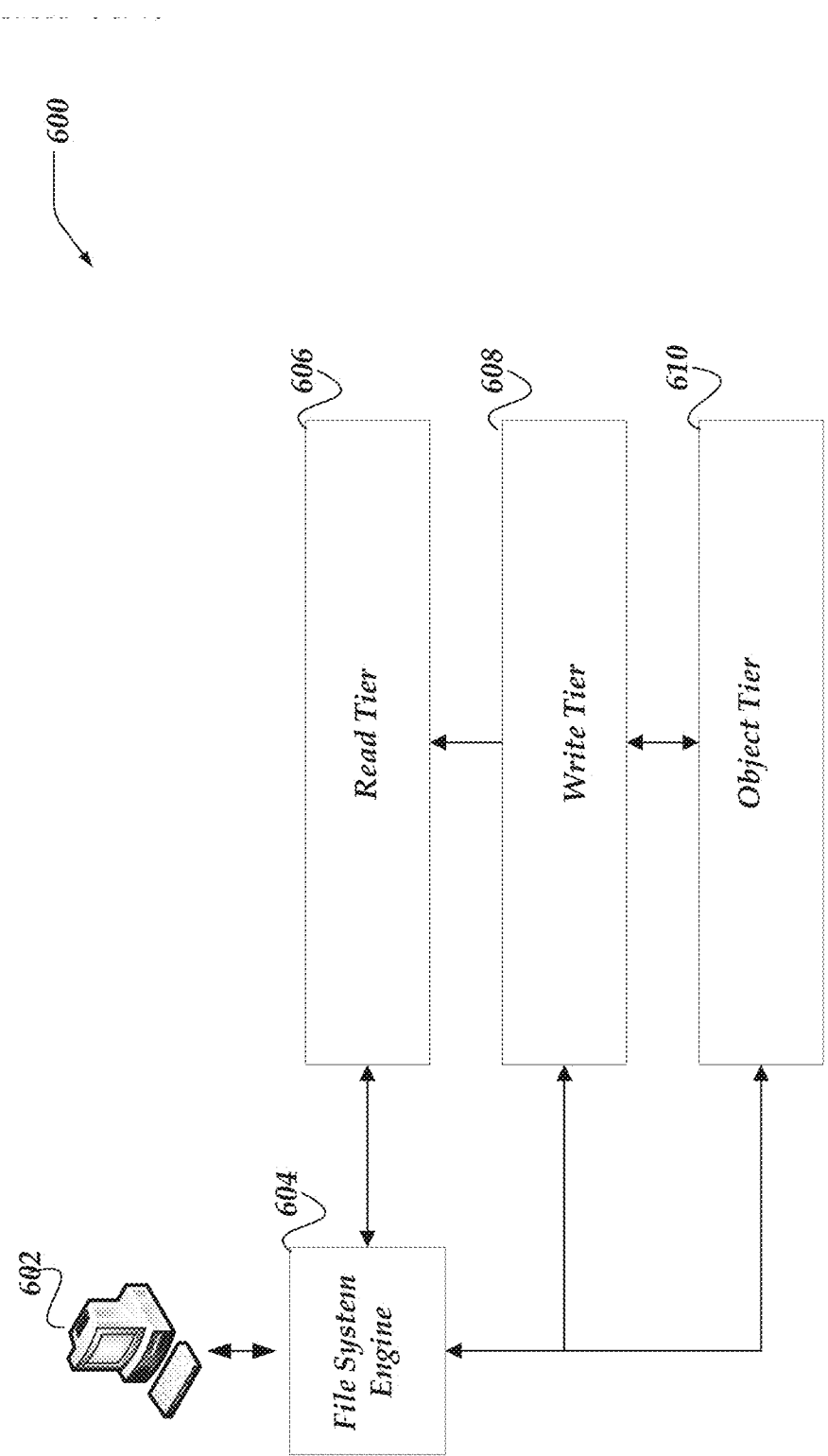
FIG. 6 illustrates a logical schematic of a file system for object-based storage with garbage collection and data consolidation in accordance with one or more of the various embodiments.

FIG. 6 illustrates a logical schematic of file system 600 for object-based storage with garbage collection and data consolidation in accordance with one or more of the various embodiments. In some embodiments, file systems may be implemented in one or more cloud computing environments. Often, data storage services provided by cloud computing providers may mimic some or all features of conventional disk drives. For example, most cloud computing providers provide features or services, such as block storage services (e.g., block storage) that may be based on or otherwise emulate conventional hard drives.

However, in some embodiments, pricing models, performance considerations, resource/bandwidth limits/quotas, or the like, associated with cloud-based data storage services provided by cloud computing providers may be disadvantageous for naive use of such services. In some cases, latency, access limitations (e.g., IOPS quotas), capacity restrictions, capacity costs, or the like, of native cloud computing storage services may result in unpredictable performance variations, cost increases/fluctuations, reliability concerns, or the like. Accordingly, in some embodiments, file systems may be arranged to compensate for some of the disadvantages of native cloud-based storage as described herein.

In some embodiments, file systems, such as, file system 600 may be arranged to provide storage services by organizing stored data (including meta-data) by providing multiple storage tiers.

In some embodiments, file systems may be arranged to organize data into read tiers, write tiers, or object tiers. In some embodiments, read tiers, such as read tier 606 may be arranged to provide low latency read-only operations for data cached in the read tier. In some embodiments, write tiers, such as write tier 608 may provide persistent stable storage with some performance limitations or cost considerations. And, in some embodiments, object tiers, such as object tier 610 may be arranged to provide lower cost long-term storage at the cost of latency or data format mismatch such as providing object based storage rather than block storage. In this context, data format mismatches may be considered to include the semantic or API mismatches between conventional file system operations and object oriented operations.

In some embodiments, read tiers, such as read tier 606 may be considered to provide ephemeral storage that may be assumed to become unavailable more or less at the whim of the cloud computing environment. Generally, cloud computing environments may enable ephemeral storage to be associated with compute instances. In some cases, ephemeral storage may enable performant read/write services for the associated compute instances. However, in some cloud computing environments, if compute instances may be moved (within the cloud computing environment) or reset/re-provisioned, ephemeral storage may be automatically irrevocably discarded. Accordingly, ephemeral storage may be considered non-durable storage. Thus, in some embodiments, reliable file systems may employ ephemeral storage for temporary or otherwise non-durable caching. For example, ephemeral storage may be employed for providing read caches of file system data while other tiers (e.g., write tier or object tier) may provide persistent (e.g., recoverable) data storage services.

In some embodiments, write tiers, such as, write tier 608 may be considered to be block storage devices that provide persistent storage for compute instances. In some cases, block storage may provide a reserved storage capacity that may generally provide features that may operate similarly to hard disks. In some cases, cloud computing providers may rate limit the number of input/output operations (IOPS) associated with accessing block storage. In some cases, this rate limiting may be independent of the general purpose bandwidth or data transfer services provided within the cloud computing environment. Also, in some cases, cloud computing providers may charge different prices for general purpose bandwidth or data transfer versus the cost for accessing block storage. Accordingly, in some embodiments, file systems may be arranged to intentionally manage the I/O operations directed to block storage devices to reduce or manage costs.

In some embodiments, cloud computing environments may provide object storage services referred to herein as object stores or object storage. In some cases, object stores may be the lowest cost data storage offered by cloud computing providers. However, in some cases, object stores may behave or operate differently than hard disks or their cloud-based analogs (e.g., block storage). For example, object stores may store data in unordered/non-indexed buckets of arbitrarily sized objects while block storage may store data in indexed/ordered blocks of a fixed size. Accordingly, for example, in some cases, a file that consumes 1000 blocks of block storage may be stored in a single object in an object store. Also, while block storage may provide interfaces that easily enable random data access, object stores may typically be limited to provide access to entire objects rather than object portions. Further, for example, in some cases, objects in object stores may be immutable such that updating a portion of the data in an object requires the entire object to be replaced rather than just replacing the modified portions of the affected objects within the object store. Also further, for example, object stores may employ cataloging/naming semantics that may be different from indexing/naming semantics used by block storage. For example, data in block storage may be accessed using addresses, address ranges, offsets, or the like, that reference fixed-sized blocks or ranges of fixed-sized blocks while objects typically may be accessed using object names or object identifiers rather than addresses.

Accordingly, in some embodiments, file systems, such as file system 600 may be arranged to leverage the different types of storage facilities offered by cloud computing environments to provide performant, reliable, and consistent storage.

In this example, for some embodiments, client 602 may be considered to be a file system client that may be reading or writing file system items (e.g., documents) in the file system. In some embodiments, file system engines, such as file system engine 604 may be arranged to provide interfaces that enable client 602 to conventionally access the file system absent awareness of the underlying tiered architecture. Accordingly, in some embodiments, file system engines may be arranged to employ read tiers, write tiers, or object tiers in concert to provide performant, reliable, and consistent storage service to one or more clients.

Figure 7:
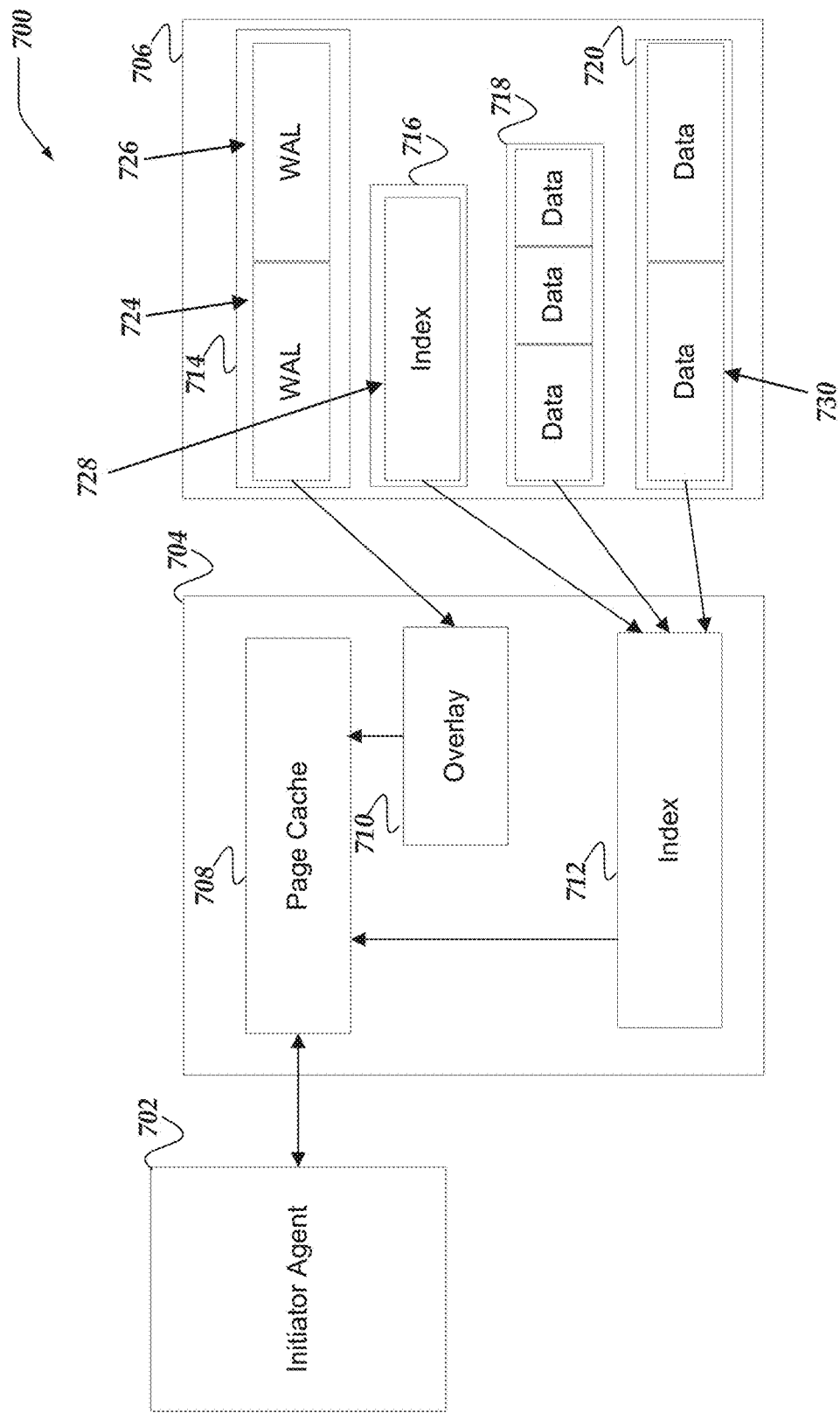
FIG. 7 illustrates a logical schematic of a file system for object-based storage with garbage collection and data consolidation in accordance with one or more of the various embodiments.

FIG. 7 illustrates a logical schematic of file system 700 for object-based storage with garbage collection and data consolidation in accordance with one or more of the various embodiments.

As mentioned above, in some cases, file systems may employ object storage services provided by one or more cloud computing providers for storing some or all data in the file systems.

Further, as mentioned above, in some cases, object tiers that use object storage may be part of a more expansive system that may include other tiers or layers, such as, read tiers/read caches, write tiers/write caches, or the like. Accordingly, in some embodiments, object tiers disclosed herein may be employed with one or more different read tiers, write tiers, or the like. However, for brevity and clarity detailed discussion of read tiers or write tiers are omitted herein. Similarly, one of ordinary skill in the art will appreciate that distributed file systems may include many other systems/sub-systems for providing features for distributed file systems, including, but not limited to, data protection (e.g., erasure coding), high availability, recovery operations, mirroring, file system protocol support (e.g., NFS, SMB, or the like), access control, user privilege management, cluster/node management, or the like. However, for brevity and clarity, detailed descriptions of these features are also omitted.

Accordingly, in some embodiments, object tiers as described herein may be employed with various file system "front-ends" that may provide some or all the features for providing a complete file system that employs object storage as described herein.

In some embodiments, file systems may be arranged to include one or more initiator agents, such as initiator agent 702. In some embodiments, initiator agents may be file system components that may be provided file system requests for reading, writing, deleting, updating, or moving data in the file system. In some embodiments, requests provided to initiator agents may be considered low-level requests that may be part of a larger command transaction. Accordingly, in some embodiments, these requests may generally include address information, location information, block addresses, block counts, block ranges, and data for writes rather than files, documents, videos, or the like, or other application level file system items. For example, while a file system user may submit a command transaction to the file system such as "open my resume.doc" the initiator agents in file system may receive requests more akin to "read blocks 1000-1100" or "read 10 blocks starting at address 0x44594". Accordingly, detailed descriptions herein will omit discussion of how the file system determines which blocks are required for answering command transactions directed to file system items (e.g., documents).

In some embodiments, if initiator agent 702 may be provided one or more read requests, initiator agent 702 may be arranged to forward the requests to coordinator agent 704. In some embodiments, coordinator agents may be portions of file system engines that may be arranged to manage some actions associated with servicing file system requests that may be provided to initiator agents.

In some embodiments, initiator agent 704 may be arranged to include one or more of page cache 708, overlay 710, in-memory index 712, or the like. In some embodiments, page cache 708, overlay 710, in-memory index 712 may be in-memory data structures that contribute to object-based storage with garbage collection and data consolidation. Accordingly, in some embodiments, if the requested data blocks may be found in page cache 708, coordinator agent 704 may return them immediately to the initiator agent. One of ordinary skill in the art will appreciate that file system engines may be arranged to apply various read cache strategies for determining if blocks may be held in or pre-loaded in the page cache as per one or more file system policies. Accordingly, for brevity or clarity detailed discussion of read cache strategies is omitted herein. Also, in some embodiments, file system engines may be arranged to determine particular read cache strategies based on configuration information to account for local requirements or local circumstances.

In one or more of the various embodiments, if the requested data blocks may be absent from page cache 708, coordinator agent 704 may be arranged to examine overlay 710 or in-memory index 712 to determine if the requested blocks may be stored in object store 706.

In some embodiments, object store 706 may be an object based data storage. Accordingly, in this example, for some embodiments, objects, such as, object 714, object 716, object 718, object 720 may represent objects stored in object store 706. In some embodiments, different objects may be used for different purposes by the file system, however, generally, the object store may not distinguish objects based on the role they may serve in the file system. However, in some embodiments, file system engines may be arranged to configure the data stored in objects in particular ways for particular purposes. In this example, for some embodiments, object 714 may represent an object that may be storing one or more WAL entries corresponding to one or more write requests of a command transaction. Likewise, in this example, for some embodiments, object 716 may represent an object that may be storing durable index information related to the file system and the data stored in the object store. Also, in some embodiments, object 718 and object 720 may represent objects that may be storing file system data (data blocks) stored in the object store.

In one or more of the various embodiments, object 714 may be arranged to include WAL entries that may correspond to portions of prior write transactions that have been distributed in the file system. In some embodiments, WAL entries may be considered to be data structures of that include one or more fields, such as sequence numbers, associated command transactions, payload sizes, addresses of blocks associated with the payload of a portion of a transaction, other meta-data, or the like, as well as, contiguous portion that includes the actual data blocks for writes (payload). Also, in some embodiments, WAL entries may represent delete operations such that they may include entries that indicate which blocks are deleted rather than including the data for those blocks.

In some embodiments, data block payloads in WAL entries may be portions of file system items rather than being an entire file or document. For example, for some embodiments, file system engines may be arranged to distribute portions of documents (or the like) across multiple WAL entries that may be stored in separate or different objects that may be in different object stores according to data protection schemes, one or more performance considerations, or the like. For example, in some embodiments, a data protection scheme may be configured to distribute blocks associated with the same document across multiple object stores according to a data protection policy. Accordingly, in some embodiments, WAL entry 724 may store data of a first document while WAL entry 726 may store data for another document rather than object 714 storing data for a single document or a complete document. Note, in some cases, depending on file system activity, data protection schemes, or the like, one or more WAL entries associated with the same document may be kept in the same object or object store.

In some embodiments, object tiers may be arranged to include at least one object that stores a durable index. In this example, for some embodiments, object 716 may represent an object that is storing a data structure that includes an index, such as index 728 that provided index entries for the data blocks in the object store 706.

In some embodiments, object stores may be arranged to include one or more objects, such as, object 718 or object 720 for storing the actual data blocks for the file system. In some embodiments, data objects may be former WAL objects that have been integrated into index 716. In some embodiments, file system engines may be arranged to periodically or conditionally update index objects to include index entries that reference the blocks included in WAL entries. Note, in some embodiments, WAL objects may be assumed to left 'in-place' such that the index entries in the index reference the data in the WAL entry directly rather performing a data transformation (e.g., copying, re-writing, moving, or the like) on the WAL objects to convert them into data objects.

In some embodiments, file system engines may be arranged to include some of the meta-data included in the WAL object to create an index entry that points directly to the data included in the WAL object. Accordingly, in some embodiments, if an index object may be updated to include entries that reference data in a WAL object, the WAL object may be considered to be a data object. For example, in some embodiments, data blocks that comprise data object 730 may have initially been stored in object store 706 as a WAL object (not shown) and then converted to a data object after index object 716 was updated to include entries that reference the data blocks included in the former WAL object. See, at least, FIG. 9.

Accordingly, in some embodiments, overlay 710 may be a data structure that may be organized to efficiently determine if addresses of data blocks associated with the read requests may be stored in a WAL object in object store 706. Accordingly, in some embodiments, overlays may include entries that map ranges of block addresses to an object identity or the object identity and an offset. Accordingly, in some embodiments, the object identity may indicate which WAL object in the object store (if any) is storing a WAL entry that includes the requested data while the offset value (either from the overlay object or an object-level index) may indicate may correspond to a location where the WAL entry of interest begins within the identified WAL object.

Note, in some cases, for some embodiments, the offset values may point to a beginning of a WAL entry such that one or more fields in the WAL entry data structure may be examined to find particular blocks that may be included in the WAL entries.

In some embodiments, overlays may include various data structures for efficiently determining if one or more blocks or one or more block addresses may be included in a particular WAL entry. In some embodiments, file systems may be arranged to enable different data structures for different index types to be employed. For example, in some embodiments, file system developers or file system administrators may determine by experiment or policy to select from among particular data structures, such as, b-trees, binary trees, skip lists, maps, hashes, or the like, for implementing overlays. Accordingly, in some embodiments, file system engines may be arranged to determine particular index data structures for overlays based on rules, instructions, libraries, or the like, provided via configuration information rather than being limited to one single type of data structure.

In one or more of the various embodiments, index 712 may be an in-memory index (non-durable) that includes entries similar to (or pulled from) index object 716. Accordingly, in some embodiments, the in-memory index may be employed to efficiently determine which object (if any) in the object store may include the requested data blocks. In some embodiments, file system engines may be arranged to execute a checkpoint operation that updates the in-memory index (e.g., index 712) if index object 716 may be updated.

Accordingly, in some embodiments, if the requested blocks may be absent from page cache 708, coordinator agents may be arranged to determine from overlay 710 or in-memory index 712 which objects, if any, may be storing the requested blocks.

In some embodiments, if the requested blocks may be found in the object store, the coordinator agent may read them from the object store and provide them to the initiator agent to satisfy the read request. In some embodiments, file system engines may be arranged to add the blocks read from the object store to the in-memory page cache in accordance with one or more read cache policies that may be in force in the file system.

Figure 8:
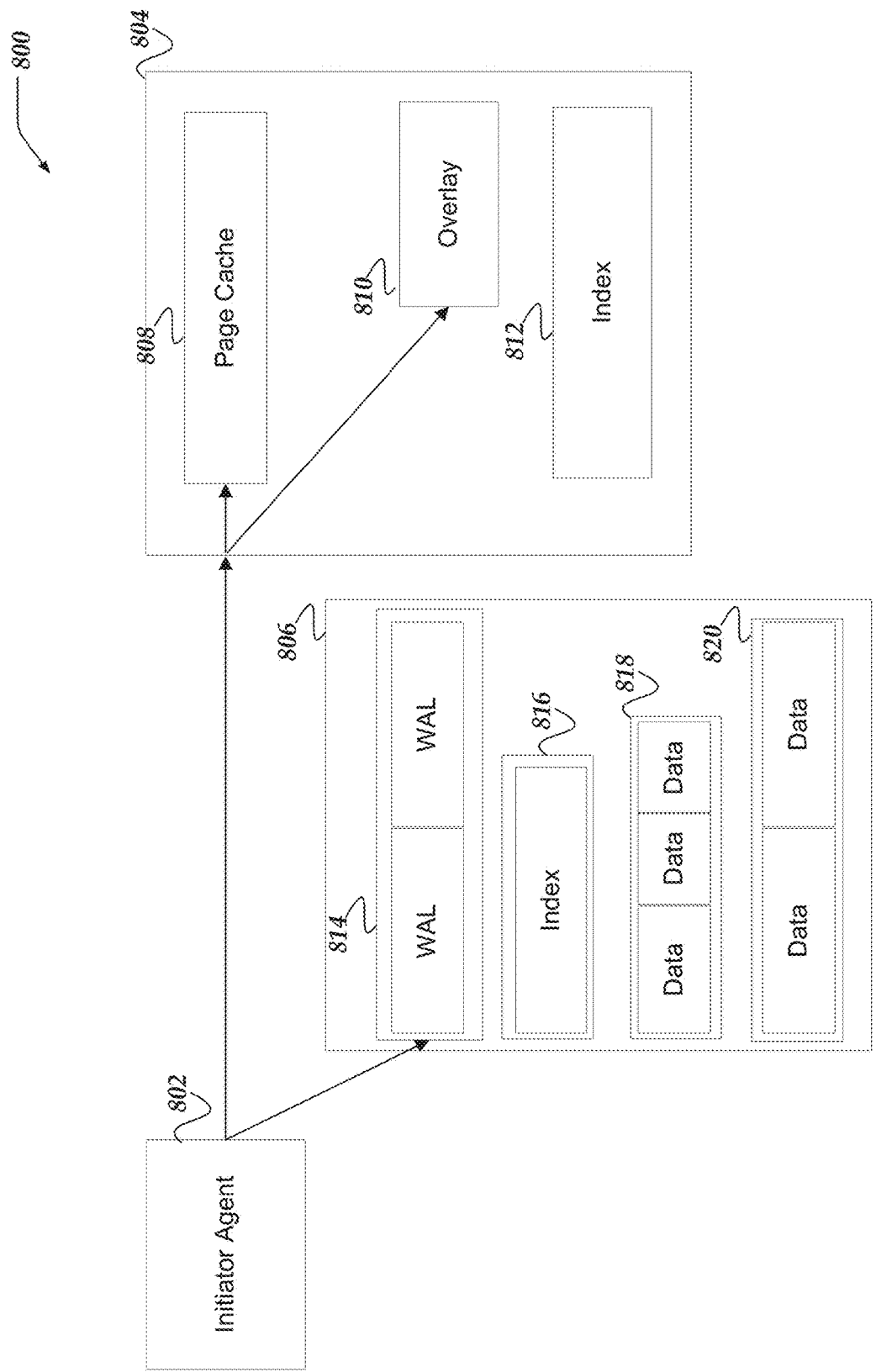
FIG. 8 illustrates a logical schematic of a file system for object-based storage with garbage collection and data consolidation in accordance with one or more of the various embodiments.

FIG. 8 illustrates a logical schematic of file system 800 for object-based storage with garbage collection and data consolidation in accordance with one or more of the various embodiments. This figure (FIG. 8) is provided here to support a description of how write operations may occur. Many of the object tier components represented in FIG. 8 may be considered similar to like-named components described in FIG. 7. Accordingly, descriptions of some components may be abbreviated to reduce redundant descriptions.

In some embodiments, similar to the initiator agent described above for FIG. 7, initiator agent 802 may be provided write requests associated with write transactions from various file system clients. Higher level file system components may determine how the write requests may be routed from client interfaces to file system to the initiator agent and are not described here. Also, in some embodiments, similar to how read requests may be considered low-level with respect to client activities, write requests may also be considered low-level, such that they include blocks of data that may be part of a larger write transaction. In some cases, for some embodiments, the blocks being written may be part of file, documents, or other higher-level file system items.

In some embodiments, initiator agents, such as initiator agent 802 may be arranged to forward meta-data about write requests to coordinator agents, such as coordinator agent 804. In some embodiments, the forwarded meta-data may include the size (amount blocks) that the write request may be attempting to store. Also, in some embodiments, because file systems support random access semantics, the write request may include address information or location information indicating where in the file system address space that data should be written to. In some embodiments, data blocks in a file system may be associated with address information or offset values that may be mapped to a logical address space of the file system. For example, a write request may include one or more of a starting address, run-length, offset values, or the like, that may be mapped to the addressable locations where the data blocks may be stored in the file system.

In some embodiments, initiator agent 802 may provide the address information and write size information to coordinator agent 804. In some embodiments, coordinator agent 804 may be arranged to perform one or more operations to prepare for storing one or more write transactions in the object store. Accordingly, in some embodiments, coordinator agent 804 may examine page cache 808 to determine if the write request would store data that may invalidate data that may currently reside in page cache 808. For example, if page cache 808 includes one or more blocks that may be affected by pending write requests those cached blocks may be invalidated such that they may not be used to respond to subsequent read requests until they are refreshed with the newly written data blocks.

In some embodiments, coordinator agent 804 may be arranged to update the in-memory overlay 810 to track which data blocks may be included in the soon to be generated WAL objects. Accordingly, in some embodiments, the overlay data structures may be updated to indicate that a WAL entry may be associated with one or more data blocks. In some embodiments, coordinator agents may be arranged to determine an object identifier and insert the meta-data associated with pending write requests into the overlay. In some embodiments, this meta-data may include address information, run-length (e.g., number of blocks), allocation type (e.g., write or delete), or the like. In some embodiments, coordinator agents may be arranged to provide the object identifier to the initiator agent.

In some embodiments, initiator agents may be arranged to generate one or more WAL entries for storing one or more write requests. In some cases, for some embodiments, initiator agents may include a write queue that may be holding more than one write request. Accordingly, in some embodiments, the initiator agent may generate more than one WAL entries that may be included in a WAL object. Also, in some embodiments, initiator agents may be arranged to generate a single WAL entry that includes more than one write request.

Generally, object stores provided by cloud computing providers provide immutable objects such that to change or update the contents of an object, an application has to read the object from the object store, update the data as needed, and then store a new object that includes the updated data.

Accordingly, in some embodiments, initiator agents may be arranged to generate new WAL objects that include the WAL entries for the pending write requests. In some embodiments, the new WAL object may be named using the object identifiers provided by the coordinator agents. In some embodiments, initiator agents may be arranged to write the objects directly to the object store. Accordingly, in some embodiments, the WAL objects holding the WAL entries and data blocks for the write requests may be written to the object store directly from the initiator agents rather than communicating them to the coordinator agent or other facility. Thus, in some embodiments, the number of IOPS or bandwidth consumption in the object tier may be reduced.

Also, in some embodiments, if the initiator agent successfully stores the new WAL object to the object store, the initiator agent may respond to the file system engine that the write request is completed. Note, in some embodiments, file systems may include higher-level systems that may refrain from sending a final acknowledgment to clients until each write request of a write transaction may be completed. Accordingly, in some embodiments, initiator agents may acknowledge that the write requests they received may be contributing to the process of completing a write transaction to write a document or other file system item to the object tier.

Note, in this example, for completeness, FIG. 8 includes in-memory index 812. However, in some embodiments, object store writes do not use the index to determine where or how to write data to the object store. As described in more detail below, index 812 may be updated if object stores checkpoint WAL objects into data objects which may occur independently of processing incoming write requests.

Likewise, in this example, for completeness, FIG. 8 includes index object 816, data object 818, and data object 820. In some embodiments, these objects do not participate in storing WAL objects for write requests in object stores.

Figure 9:
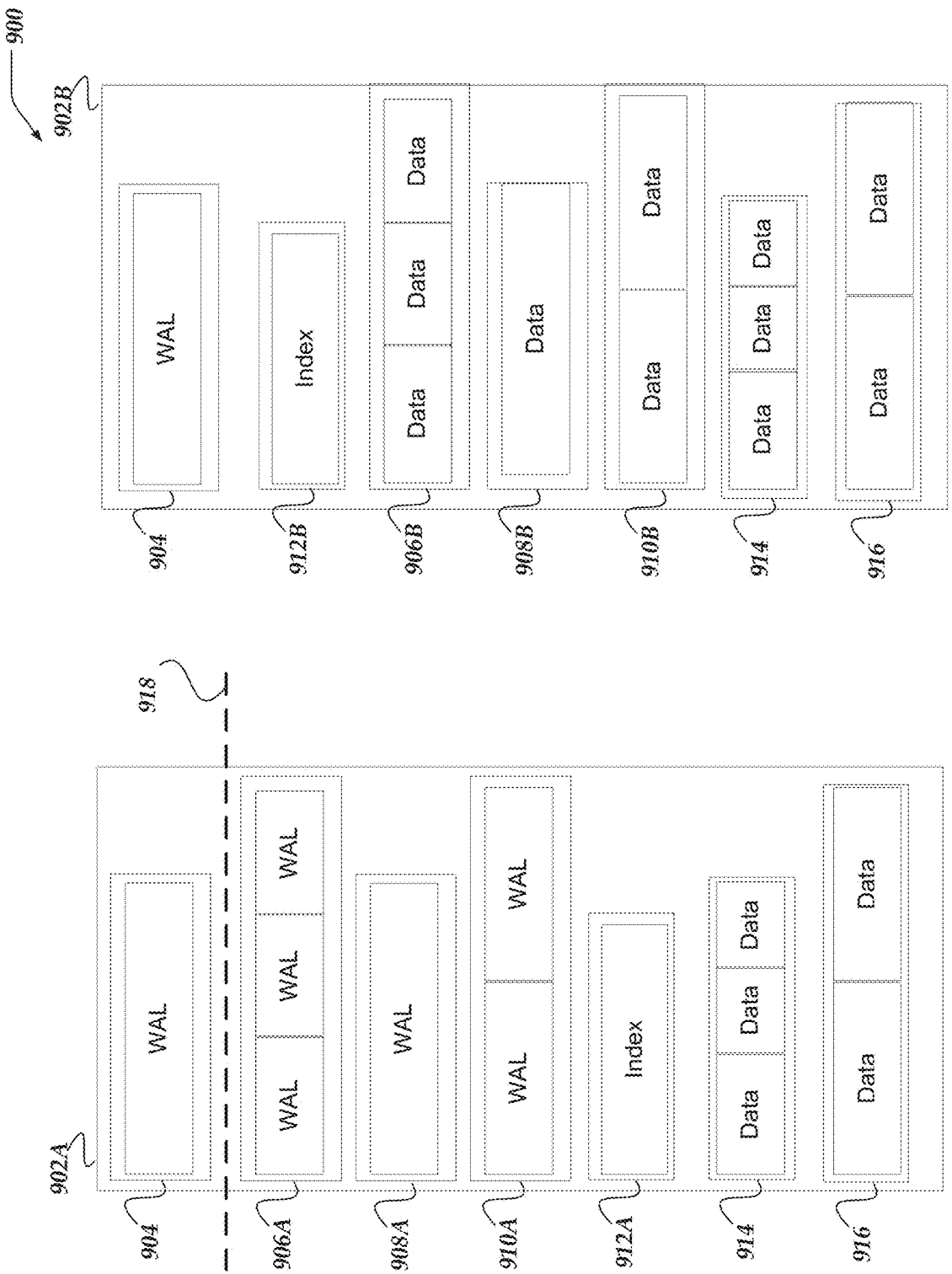
FIG. 9 illustrates a logical schematic of a portion of an object tier for object-based storage with garbage collection and data consolidation in accordance with one or more of the various embodiments.

FIG. 9 illustrates a logical schematic of a portion of object tier 900 for object-based storage with garbage collection and data consolidation in accordance with one or more of the various embodiments. As described above, initiator agents may store objects in the object store that include WAL entries.

In some embodiments, file system engines may be arranged to periodically or conditionally execute a checkpoint operation on an object store to update an object store index and convert WAL objects into data objects. Accordingly, in some embodiments, file systems may be configured to apply one or more checkpoint policies that may determine if a checkpoint operation may be executed. In some embodiments, checkpoint policies may declare one or more conditions that may trigger a checkpoint operation. For example, a checkpoint policy may trigger a checkpoint operation if the number of globally committed WAL objects exceeds a threshold value. Note, in some embodiments, globally committed WAL objects may be considered to be WAL objects that are associated with write transactions that are fully committed across the entire file system. For example, an initiator agent may be provided some write requests corresponding to a larger write transaction that the file system may be distributing portions across multiple nodes in the file system cluster. Continuing with the example, if all of the write requests for the write transaction have been locally committed, the associated WAL entries may be considered globally committed. In contrast, in some embodiments, if a WAL object is committed in an object store, the WAL object may be considered locally committed until other associated WAL objects with the same write transaction may be committed to their local object store.

Accordingly, in some embodiments, some WAL objects in an object store may be globally committed while other WAL objects in the same object store may be locally committed while waiting for any sister WAL objects to be committed across the file system. Thus, in some embodiments, globally committed WAL objects may be eligible for participating in a checkpoint operation.

In this example, for some embodiments, object store 902A represents an object store before a checkpoint operation has been executed and object store 902B represents the object store after the checkpoint operation has been executed. Also, in this example, for some embodiments, WAL object 904 represents a WAL object that may be considered to be locally committed and not globally committed; WAL object 906A, WAL object 908A, and WAL object 910A may represent WAL objects that may be considered to be globally committed; index object 912A represents an index object stored in the object store; and data object 914 and data object 916 represent data object stored in the object store. Also, for clarity, dashed line 918 may be considered a logical boundary between WAL objects that are globally committed and WAL objects that are locally committed.

Accordingly, in some embodiments, if file system engines may initiate a checkpoint operation, file system engines may determine the globally committed WAL objects in the object store. In this example, for some embodiments, WAL object 906A, WAL object 908A, and WAL object 910A may be considered globally committed. In some embodiments, file system engines may be arranged to generate an updated index object that includes entries to the data blocks that may be stored in the WAL objects. Note, in some embodiments, the updated index object may be updated while the WAL objects may remain unmodified. Thus, in some embodiments, the number of objects that need to be read from the object store and stored into the object store for a checkpoint operation may be limited to the index object.

In some embodiments, object store 902B represents the object store after the checkpoint operation has completed. Accordingly, in some embodiments, WAL object 904 may remain since it was not eligible to be included in the checkpoint operation. Also, in some embodiments, index object 912B may now be considered to include entries that reference the former WAL object 906A, WAL object 908B, and WAL object 910A transforming them into data object 906B, data object 908B, and data object 910B. Further, in this example, for some embodiments, the data objects that were in object store 902A remain in object store 902B as they were not party to the checkpoint operation.

Note, in most cases, objects in object stores may be stored in unordered collections of named objects. Accordingly, the sort order of lists of objects in object stores may be based on how the object names may be sorted in response to object list queries that may be sent to the cloud computing provider. In practice, cloud computing providers may be assumed to opaquely manage how the objects in object store may be arranged or ordered.

However, in some embodiments, file system engines may be arranged to generate object identifiers that enable ordered results that conform to an object sort policy. In some embodiments, sort policies may sort object name lists in the following order: WAL objects, index objects, data objects. In some embodiments, this sort order may be advantageous because in some cases file systems may have object stores that may store hundreds or thousands of data objects. Thus, in some cases, an object list query may have a multi-page result set that would require multiple query page requests to obtain the entire list. Clearly, this may be disadvantageous because checkpoint operations typically concern the WAL objects and the index object without concern for existing data objects.

Figure 10:
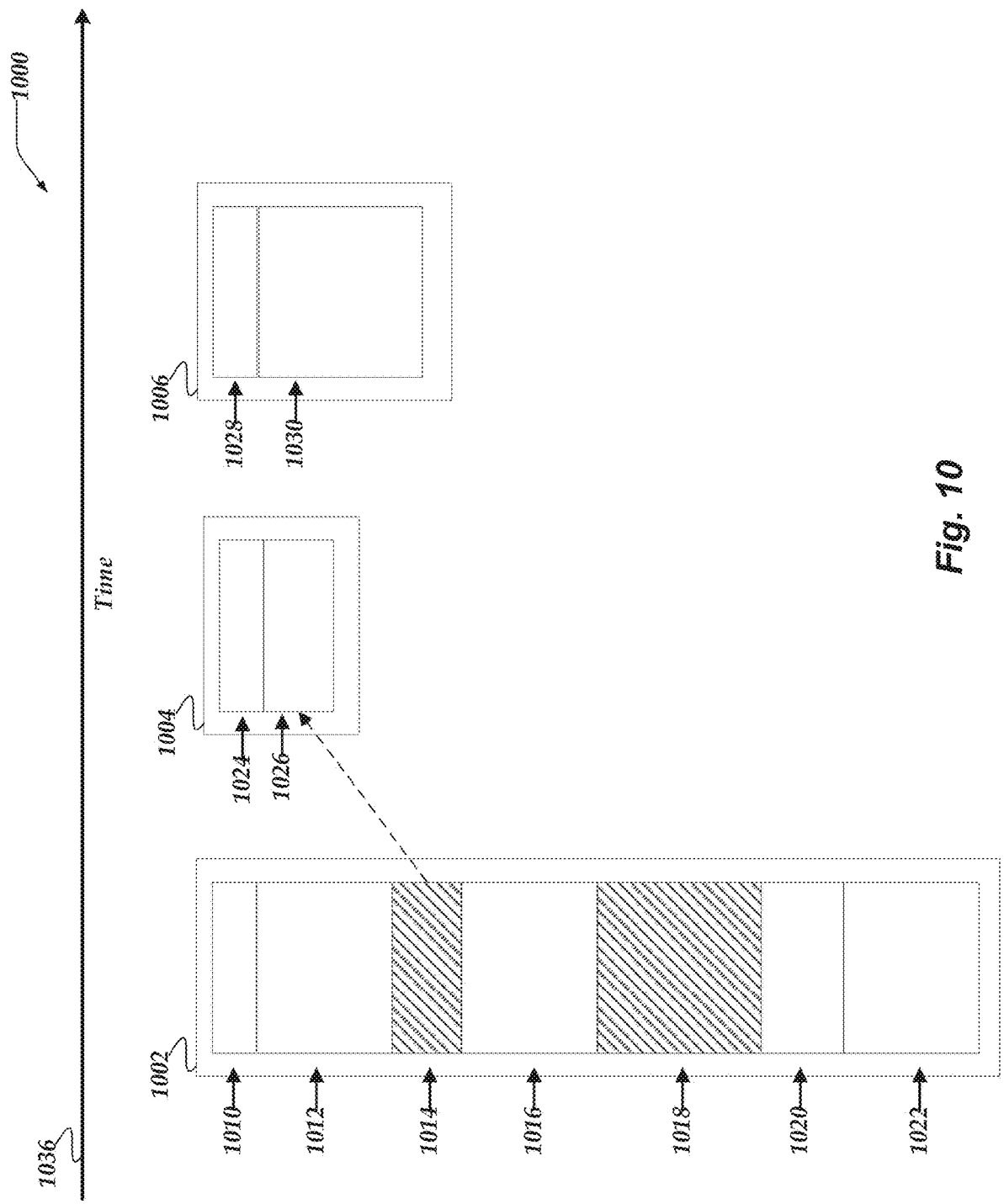
FIG. 10 illustrates a logical schematic of a portion of an object tier for object-based storage with garbage collection and data consolidation in accordance with one or more of the various embodiments.

FIG. 10 illustrates a logical schematic of a portion of object tier 1000 for object-based storage with garbage collection and data consolidation in accordance with one or more of the various embodiments.

In some embodiments, as mentioned above, data objects may be arranged to include data blocks that include data for portions of various documents (or other file system items). During the normal operations of file systems, users may delete documents, files, move directories, rename files, or the like. Accordingly, in some embodiments, some or all data blocks included in the data objects may be deleted from the file system. In some embodiments, file system engines may be arranged to mark as-deleted those data blocks that users indicate should be deleted. Further, in conventional file systems that may use block storage devices (e.g., hard disks or cloud provided block storage), the individual deleted data blocks may be removed from the file system fairly efficiently because in many cases data blocks may be accessed individually such that individual data blocks or groups of data blocks may be selectively removed from block storage devices.

However, in some embodiments, if data blocks stored in data objects in object stores may be marked for deletion, the data for those 'deleted' data blocks may remain in the data object. For example, if a data object is storing 20000 4 KiB data blocks, if a user issues commands to delete 10000 of those data blocks, file system engines may be arranged to perform various accounting activity, ref-counting, index updating, or the like, to mark those 10000 data blocks as unreferenced. Thus, in this example, from the point of view of users, the 10000 deleted data blocks are no longer available in the file system. However, in this example, even though the 10000 deleted data blocks appear to be removed from the file system from the point of view of users, the actual data object they were in remains the same size as far as the cloud computing provider may be concerned. Thus, in some cases, the cloud computing provider may continue to charge users or the file system operator based on the entire size of the data object-even though (in this example) half of the space in the data object may be storing 'deleted' data blocks.

Also, in some embodiments, if data blocks stored in an existing data object may be updated by a subsequent write request, the data blocks corresponding to the updated data blocks that are stored in the data object may be marked as superseded or otherwise invalid.

In this example, for some embodiments, data object 1002 may represent a data object stored in an object store. Accordingly, in this example, for some embodiments, data object 1002 may include meta-data block 1010, data blocks 1012, invalidated data blocks 1014, data blocks 1016, deleted data blocks 1018, data blocks 1020, data blocks 1022, or the like.

Also, in this example, for some embodiments WAL object 1004 may include meta-data block 1024, data blocks 1028. And, in this example, WAL object 1006 may include meta-data block 1028 and data blocks 1030.

As described above, in some embodiments, file system engines (e.g., initiator agents or coordinator agents) may be arranged to store WAL objects in object stores as write requests are processed. In this example, WAL object 1004 may represent a write request that updated or otherwise modified some data blocks that were stored in data object 1002 (e.g., updated data blocks 1014). Accordingly, in this example, data blocks 1026 may represent the data. Accordingly, in this circumstance, file system engines may mark updated data blocks 1014 as invalid because WAL object 1004 includes WAL entries that updated those blocks. However, because the updated data blocks are stored in an immutable object, invalidated data blocks still consume storage space in the data object even though they are invalid by the data blocks included in WAL object 1004.

Also, in this example, for some embodiments, deleted data blocks 1018 represent data blocks that have been deleted. Accordingly, from the point of the view of the user, those data blocks are removed from the file system. However, in some embodiments, while the file system has marked those data blocks as deleted, they still take up space in the data object and the object store because the size of the data object remains unchanged from the perspective of the cloud computing provider. Note, in this example, the WAL object that would have stored the WAL entries corresponding to the delete request is not shown. In this example, it can be assumed that the WAL object corresponding to the delete operation was removed during a checkpoint operation, garbage collection, or the like.

Further, in this example, WAL object 1006 may represent a WAL object that has been stored in the object store but not yet converted into a data object by a checkpoint operation. As mentioned above, in some embodiments, at some point in the future, checkpoint operations may update the object store index object, the coordinator agent in-memory index, the coordinator agent in-memory overlay, the WAL, or the like, converting WAL object 1006 into a data object.

Further, in this example, directed line 1036 may represent time passing. Accordingly, in this example, for some embodiments, direct line 1036 illustrates how data object 1002 is created/stored in the object store before WAL object 1004 and later WAL object 1006 may be stored in the object store.

Figure 11:
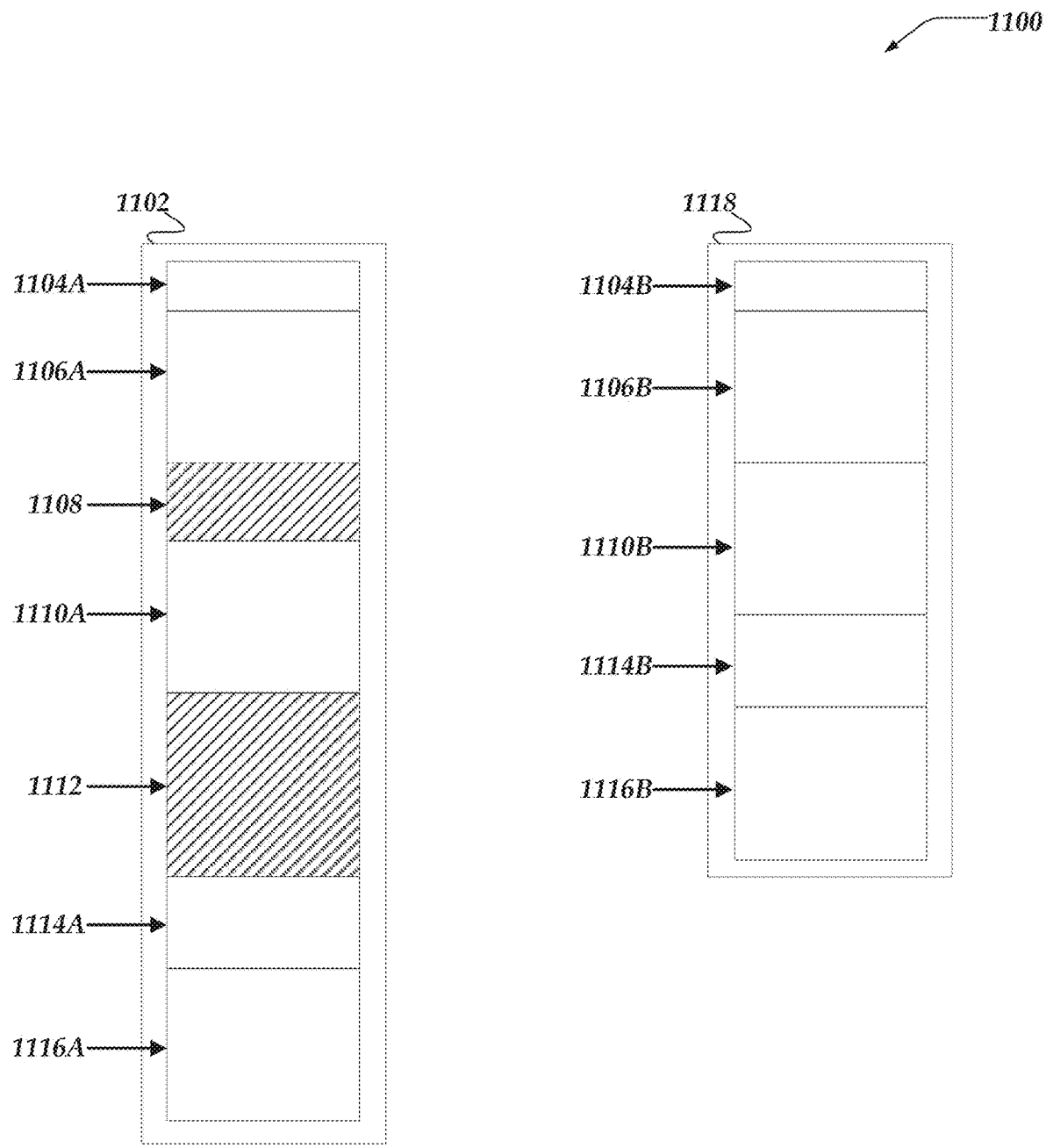
FIG. 11 illustrates a logical schematic of a portion of an object tier for object-based storage with garbage collection and data consolidation in accordance with one or more of the various embodiments.

FIG. 11 illustrates a logical schematic of a portion of object tier 900 for object-based storage with garbage collection and data consolidation in accordance with one or more of the various embodiments. As mentioned above, object stores generally enable the storage of immutable objects such that updating or modifying the contents of an object requires an entire object to be loaded from the object store and then the modified object data may be added back to the object store as a new object (as far as the object store may be concerned). While this type of object semantics may be advantageous for general-purpose object storage, it may be disadvantageous for using object stores as part of the file system. For example, in some embodiments, file system users may expect that data blocks (e.g., file system blocks) in the file system may be randomly accessed such that data in the data blocks may be deleted, moved, updated, and so on, on a data block basis. For example, a file system user may attempt to save a one line change to a document that alters one data block on the file system. In conventional block storage devices (e.g., hard disks), the file system may efficiently update the affected data block without accessing the other data blocks that comprise the document. However, in some embodiments, if an object store may provide the data storage for a file system, each data object in the object store may store many data blocks for many different documents. Naively updating a data object in response to a small change would require the entire object to be loaded from the object store, and then the entire data object (with the one modified data block) would need to be written back to the object store.

As described above for FIG. 10, in some embodiments, data objects in object stores may become fragmented with deleted or invalidated data blocks. In this example, for some embodiments data object 1102 may include meta-data block 1104, data blocks 1106A, invalidated data blocks 1108, data blocks 1110A, invalidated data blocks 1112, data blocks 1114A, data blocks 1116A, or the like. Thus, in this example, data object 1102 includes invalidated data blocks that consume storage space that cloud computing providers may charge users or file system operators for even though the space consumed by the invalidated data blocks may be considered wasted or otherwise unusable.

Accordingly, in some embodiments, file system engines may be arranged to execute one or more garage collection operations that consolidate data in data objects. In some embodiments, as mentioned, object store objects (e.g., data objects) may be considered immutable such that consolidating data in a data object may require deleting the fragmented data object and generating a new consolidated data object that excludes the invalidated data blocks.

In this example, for some embodiments, data object 1118 represents a consolidated data object based on fragmented data object 1102. Accordingly, in this example, for some embodiments, the data blocks included in data object 1118 may have the same contents as the valid data blocks in data object 1102. Accordingly, in some embodiments, meta-data block 1104B may include the same meta-data as meta-data 1104A, except some fields such as object creation date/time, internal index blocks, or the like, may be different. Also, in this example, data blocks 1106B may be considered to have the same contents as data blocks 1106A, data blocks 1110B may be considered to have the same contents as data blocks 1110A, data blocks 1114B may be considered to have the same contents as data blocks 1114A, data blocks 1116B may be considered to have the same contents as data blocks 1116A, and so on.

Thus, in some embodiments, the amount of object store storage consumed by the file system may be reduced by consolidating fragmented data objects as illustrated herein.

In some embodiments, file system engines may be arranged to determine if garbage collection operations should be initiated based on one or more garbage collection policies. In some embodiments, particular policies may be configured to account for local requirements or local priorities. For example, in some cases, if minimizing the amount of space consumed in the object store may be a priority, garbage collection policies may be configured to aggressively pursue consolidation at the expense of higher operational costs, such as, cloud computing provider fees, system latency/administration overhead, or the like. In contrast, if minimizing operational costs may be a priority, garbage collection policies may be configured to allow more wasted storage space in exchange for fewer garbage collection operations, or the like.

For example, in some embodiments, a first garbage collection policy may be configured to compare a predicted lifetime of a data object with the amount of unusable space allocated to invalidated data blocks to determine if the data object should be consolidated using garbage collection. In this example, the policy may predict the lifetime of a data object based on how long it currently has existed. For example, if the data object has existed for 2 hours a garbage collection policy may predict that the data object may live for another 4 hours (before a user might delete all of the data in the data object via file system transactions). Thus, in this example, the garbage collection policy may compute a predicted cost for performing the garbage collection versus paying cloud computing provider fees for the wasted storage. Note, in this example, the cost function may be configured to consider storage costs, operation costs, bandwidth costs, or the like, associated with cloud computing provider fees as well as potential performance impacts that may be incurred by executing garage collection operations. Also, in some embodiments, the lifetime prediction function may be configured according to observed file system activity patterns on a per-cluster basis. Further, one of ordinary skill in the art will appreciate that garbage collection policies may be subject to change based on changes in cloud computing provider pricing models, customer requirements, or the like. Accordingly, file system engines may be arranged to employ rules, instructions, or the like, for determining garbage collection policies via configuration information to account for local requirements or local circumstances.

Figure 12:
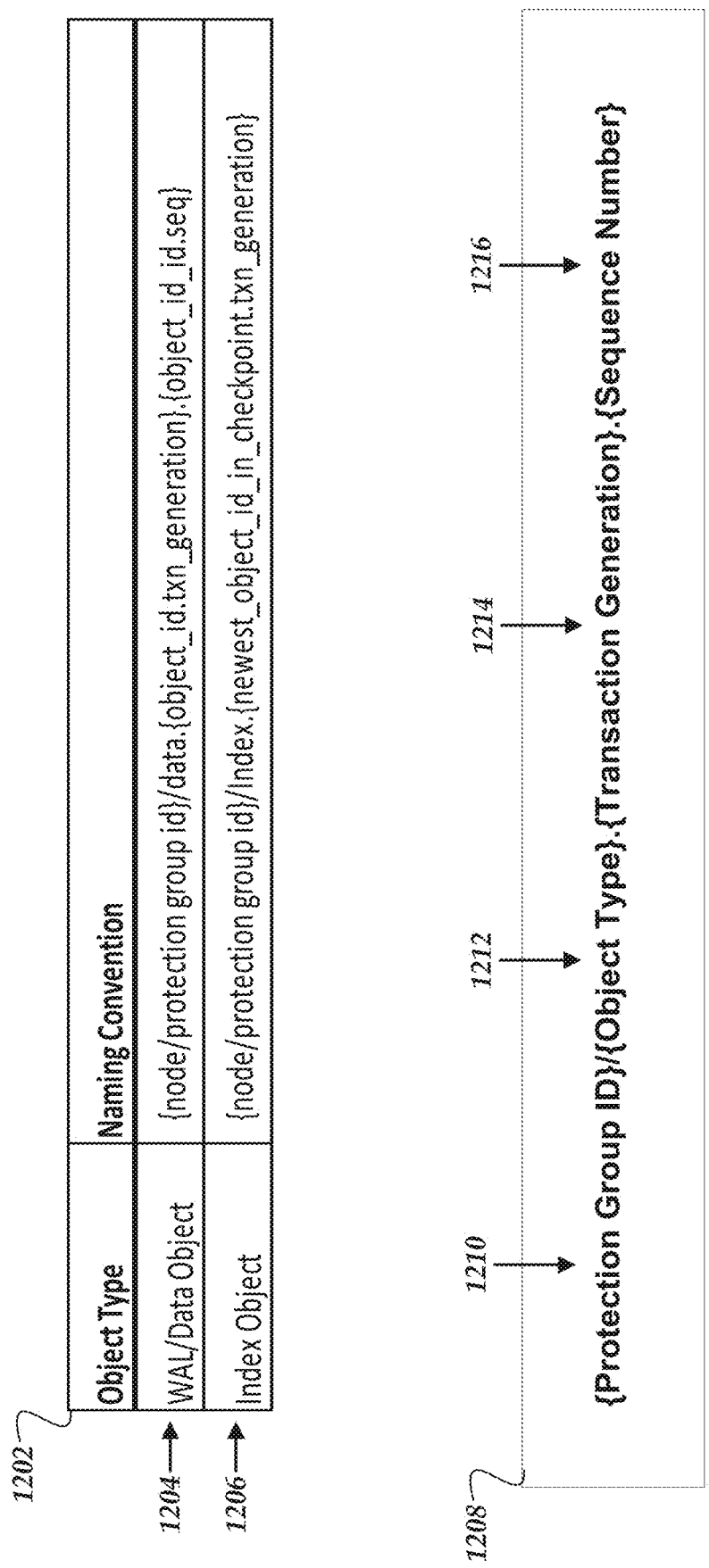
FIG. 12 illustrates a logical schematic for object naming for object-based storage with garbage collection and data consolidation in accordance with one or more of the various embodiments.

FIG. 12 illustrates a logical schematic for object naming for object-based storage with garbage collection and data consolidation in accordance with one or more of the various embodiments. As described above, objects in object stores may be addressable using object identifiers or object names. In most cases, cloud computing providers may be relatively flexible in terms of how object identifiers may be constructed. In some cases, there may be differences between or among different cloud computing providers but generally they support string-based labels. Also, in some embodiments, cloud computing providers may provide list/query APIs that enable prefix queries, sorting, grouping, or the like, based on object identifiers. Thus, while object stores rarely support a fully hierarchical object naming scheme with directories and sub-directories as provided by most file systems, the flexibility of object identifiers may be leveraged to provide support for object-based storage with garbage collection and data consolidation as described herein.

In this example, for some embodiments, table 1202 may list object identifier patterns for different types of objects that may be stored in object stores. Accordingly, in this example, for some embodiments, row 1204 illustrates a pattern for defining identifiers of WAL objects or data objects. Likewise, in this example, row 1206 illustrates a pattern for defining identifiers for index objects.

In some embodiments, differences in the labeling/identifier patterns may be selected such that object lists provided by cloud computing providers may be sorted or grouped in a particular order. In this example, the second term of the index object identifier pattern includes Index version data for other objects. Accordingly, conventional alphanumeric sorting may result in object listing query results that order index objects before other objects.

In this example, for some embodiments, identifier pattern 1208 illustrates an object identifier pattern for object-based storage with garbage collection and data consolidation. Accordingly, section 1210 may be used for indicating which protection group the object may be associated with. In this example, a protection group may be considered a logical address space that data blocks in the associated objects may be associated with. Also, in this example, section 1212 may be used for indicating the type of object (e.g., index objects, data objects, WAL objects, or the like). Also, in this example, section 1212 may include a transaction generation number which may be employed for tracking when or if the operations associated with the object are globally committed across the file system. And, finally, for this example, section 1214 declares that this section of an identifier may include a sequence number to distinguish different objects of the same type.

Note, in some embodiments, file systems may be arranged to use different object identifier patterns depending on local requirements, cloud computing provider rules, or the like. Accordingly, in some embodiments, file system engines may be arranged to employ rules, patterns, masks, or the like, provided via configuration information to account for local requirements or local circumstances that may be associated with object naming.

Generalized Operations

FIGS. 13-18 represent generalized operations for object-based storage with garbage collection and data consolidation in accordance with one or more of the various embodiments. In one or more of the various embodiments, processes 1300, 1400, 1500, 1600, 1700, and 1800 described in conjunction with FIGS. 13-18 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in cloud-based environments. However, embodiments are not so limited and various combinations of network computers, client computers, or the like may be utilized. Further, in one or more of the various embodiments, the processes described in conjunction with FIGS. 13-18 may perform actions for object-based storage with garbage collection and data consolidation in accordance with at least one of the various embodiments or architectures such as those described in conjunction with FIGS. 1-12. Further, in one or more of the various embodiments, some or all of the actions performed by processes 1300, 1400, 1500, 1600, 1700, and 1800 may be executed in part by one or more of file system engine 322, or the like.

Figure 13:
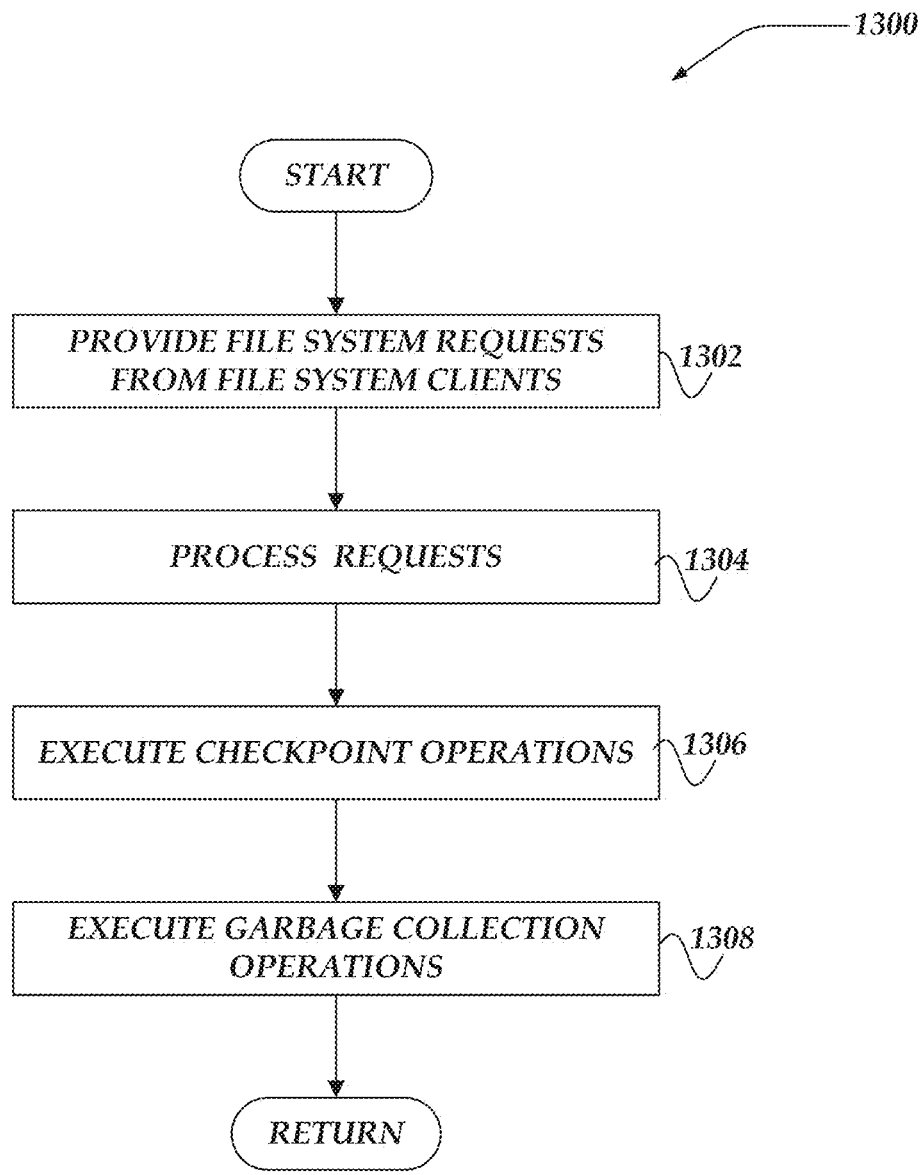
FIG. 13 illustrates a flowchart for a process for object-based storage with garbage collection and data consolidation in accordance with one or more of the various embodiments.

FIG. 13 illustrates an overview flowchart for process 1300 for object-based storage with garbage collection and data consolidation in accordance with one or more of the various embodiments. After a start flowchart block, at flowchart block 1302, in one or more of the various embodiments, one or more file system requests may be provided by one or more file system clients. In some embodiments, file system engines may be provided with one or more requests that may be part of larger file system-wide command transactions. For example, in some embodiments, if a user issues a read file command, different portions of the file data may be stored on different nodes, or different protection stores. Accordingly, in some embodiments, requests in this context may be part of a larger command transaction. However, the mechanisms for determining which requests are routed to which node may be considered out-of-scope for the innovations described herein.

At flowchart block 1304, in one or more of the various embodiments, file system engines may be arranged to process the one or more file system requests. In some embodiments, file system engines may be arranged to determine if read requests may be satisfied from in-memory caches or if they may be satisfied by WAL objects or data objects stored in object stores. Likewise, in some embodiments, file system engines may be arranged to determine if write requests should be written directly into a WAL object stored in the object store.

At flowchart block 1306, in one or more of the various embodiments, file system engines may be arranged to execute one or more checkpoint operations. In some embodiments, checkpoint operations may be executed to convert WAL objects into data objects. In some embodiments, checkpoint operations may update an index object stored in the object store to include an entry that references the new data objects (e.g., new in this context because they have been converted from existing WAL objects). Also, in some embodiments, checkpoint operations may include updating the in-memory index that may be included on coordinator agents.

At flowchart block 1308, in one or more of the various embodiments, file system engines may be arranged to execute one or more garbage collection operations. In some embodiments, data objects may store data blocks that a user or other file system client requests to delete. Accordingly, in some embodiments, the immediate effect of processing delete requests is to update indexes, reference counters, or meta-data to indicate the data blocks being deleted are 'deleted'. Accordingly, in some embodiments, subsequent requests to read those data blocks indicated as deleted will not return data even though the deleted data blocks may still be taking up space in the data objects.

Thus, in some embodiments, file system engines may be arranged to periodically or conditionally execute one or more garbage collection operations to consolidate or defragment data objects that may be storing deleted data blocks. Determining when or if to initiate a garbage collection operation may depend on rules, instructions, or the like, declared in one or more garbage collection policies or file system policies.

Next, in one or more of the various embodiments, control may be returned to a calling process.

Figure 14:
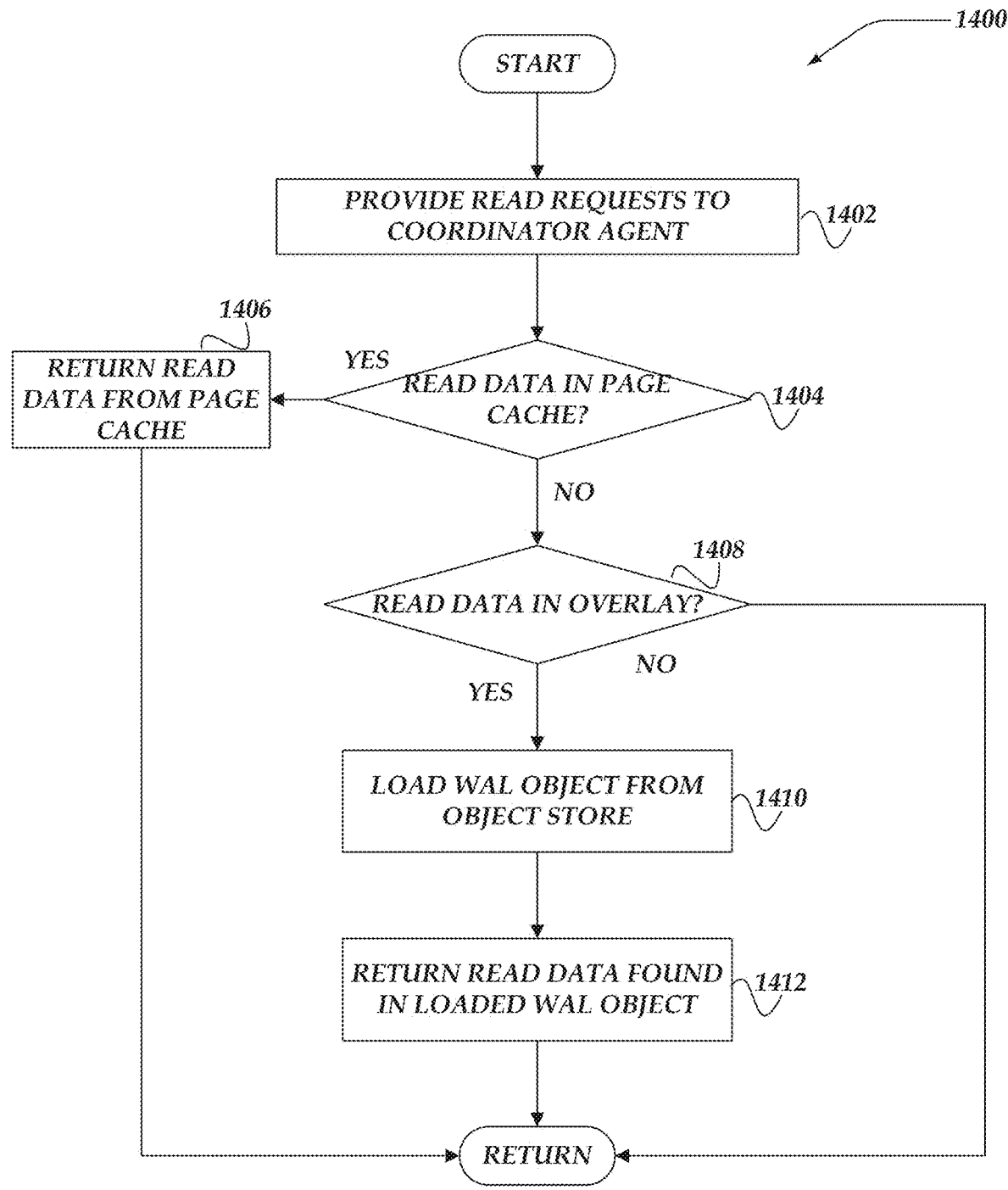
FIG. 14 illustrates a flowchart for a process for object-based storage with garbage collection and data consolidation in accordance with one or more of the various embodiments.

FIG. 14 illustrates a flowchart for process 1400 for object-based storage with garbage collection and data consolidation in accordance with one or more of the various embodiments. After a start flowchart block, at flowchart block 1402, in one or more of the various embodiments, one or more file system read requests may be provided to a coordinator agent. As described above, in some embodiments, read requests that may be part of a large file system-wide transaction may be provided to an initiator agent that may forward them to a coordinator agent that may be part of a file system engine. In some embodiments, read requests may include one or more file system addresses or address ranges that may be part of a read transaction.

At flowchart decision block 1404, in one or more of the various embodiments, if read data may be in the page cache, control may flow to flowchart block 1406; otherwise, control may flow to flowchart decision block 1408. In some embodiments, file system engines (or coordinator agents) may include an in-memory page cache. In some embodiments, page caches may be read caches that are organized to cache collections of contiguous data blocks. In some embodiments, coordinator agents may initially check if the data requested by the incoming read requests may be satisfied by data from the page cache.

At flowchart block 1406, in one or more of the various embodiments, file system engines may be arranged to return the requested read data from the page cache. Since the read requests may be satisfied by data in the page cache, the coordinator agent may return the requested data blocks to the initiator agent which may use them as part of satisfying the pending read transaction.

At flowchart decision block 1408, in one or more of the various embodiments, if read data may be in the overlay data structure, control may flow to flowchart block 1410; otherwise, control may be returned to a calling process.

In some embodiments, if a reference to the requested data blocks may be found in the overlay, this may indicate that the requested data blocks may be found in a WAL object stored in the object store. Accordingly, in some embodiments, file system engines may determine an object identifier that corresponds to the WAL object that may be storing the requested data blocks.

At flowchart block 1410, in one or more of the various embodiments, file system engines may be arranged to load a WAL object from the object store. In some embodiments, file system engines may be arranged to execute one or more cloud computing provider APIs to load a WAL object that may correspond to the object identifier determined from the in-memory overlay.

At flowchart block 1412, in one or more of the various embodiments, file system engines may be arranged to return the read data from the WAL object. In some embodiments, file system engines may be arranged to load the requested data blocks from the WAL object and return to the requester.

Next, in one or more of the various embodiments, control may be returned to a calling process.

Figure 15:
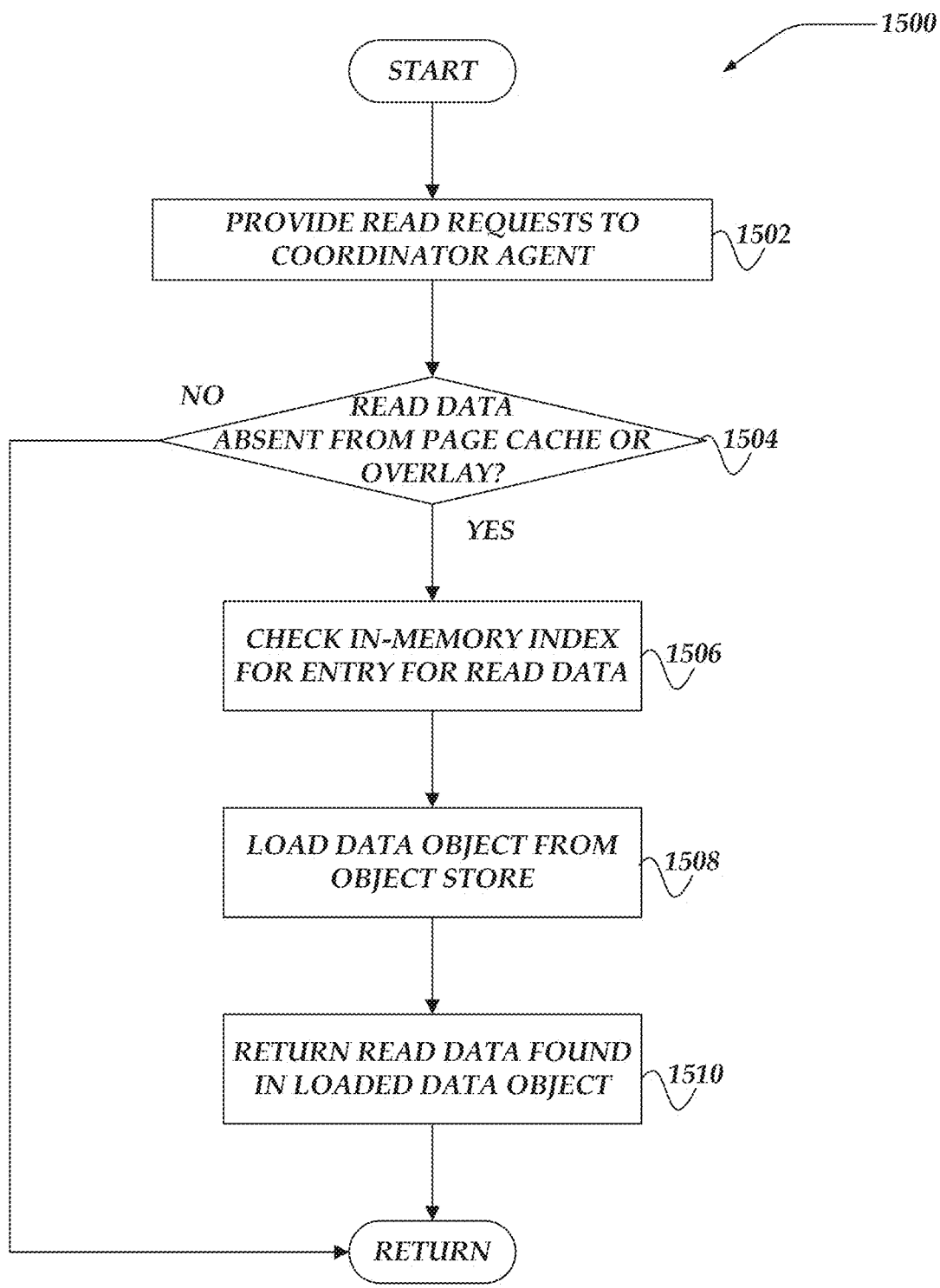
FIG. 15 illustrates a flowchart for a process for object-based storage with garbage collection and data consolidation in accordance with one or more of the various embodiments.

FIG. 15 illustrates a flowchart for process 1500 for object-based storage with garbage collection and data consolidation in accordance with one or more of the various embodiments. After a start flowchart block, at flowchart block 1502, in one or more of the various embodiments, one or more file system read requests may be provided to a coordinator agent. As described above, in some embodiments, read requests that may be part of a larger file system-wide transaction may be provided to an initiator agent that may forward them to a coordinator agent that may be part of a file system engine. In some embodiments, read requests may include one or more file system addresses or address ranges corresponding to data blocks that may be part of a read transaction.

At flowchart decision block 1504, in one or more of the various embodiments, if the requested data may be absent from the page cache or overlay, control may flow to flowchart block 1506; otherwise, control may be returned to a calling process. In some embodiments, file system engines (or coordinator agents) may include an in-memory page cache. In some embodiments, page caches may be read caches that are organized to cache collections of data blocks accordingly to one or more read cache policies that may be active for the file system. In some embodiments, coordinator agents may initially check if the data blocks requested by the incoming read requests may be satisfied by data in the page cache. If the read requests may be satisfied by data in the page cache, the coordinator agent may return the requested data blocks to the initiator agent which may use them to satisfy the pending read request.

Also, in some embodiments, if the requested data blocks may be absent from the page cache, file system engines may be arranged to check if the requested data blocks may be referenced in the in-memory overlay. In some embodiments, if the requested data blocks are referenced in the overlay, this may indicate that the requested data blocks may be found in a WAL object. (See, FIG. 14). Otherwise, in some embodiments, control may flow to flowchart block 1506.

At flowchart block 1506, in one or more of the various embodiments, file system engines may be arranged to check the in-memory index for the requested data blocks. In some embodiments, in-memory indexes may map data block addresses to data objects. Accordingly, in some embodiments, file system engines may be arranged to determine an object identifier of a data object in an object store that may be storing the requested data blocks.

At flowchart block 1508, in one or more of the various embodiments, file system engines may be arranged to load the identified data object from the object store. In some embodiments, file system engines may be arranged to employ the object identifier determined from the in-memory index to load the data object that may be storing the requested data blocks. Accordingly, in some embodiments, file system engines may be arranged to execute one or more cloud computing provider APIs that enable access to the data object corresponding to the object identifier found in the in-memory index.

At data block 1510, in one or more of the various embodiments, file system engines may be arranged to return the requested data. In some embodiments, each data object may include one or more index blocks that may indicate where particular data blocks may be stored in a particular data object. Accordingly, in some embodiments, file system engines may use the address information associated with the requested data blocks to lookup a location in the data object where the requested data may be found. Thus, in some embodiments, this data may be copied and provided to the initiator agent as part of a response to the pending read transaction.

Next, in one or more of the various embodiments, control may be returned to a calling process.

Figure 16:
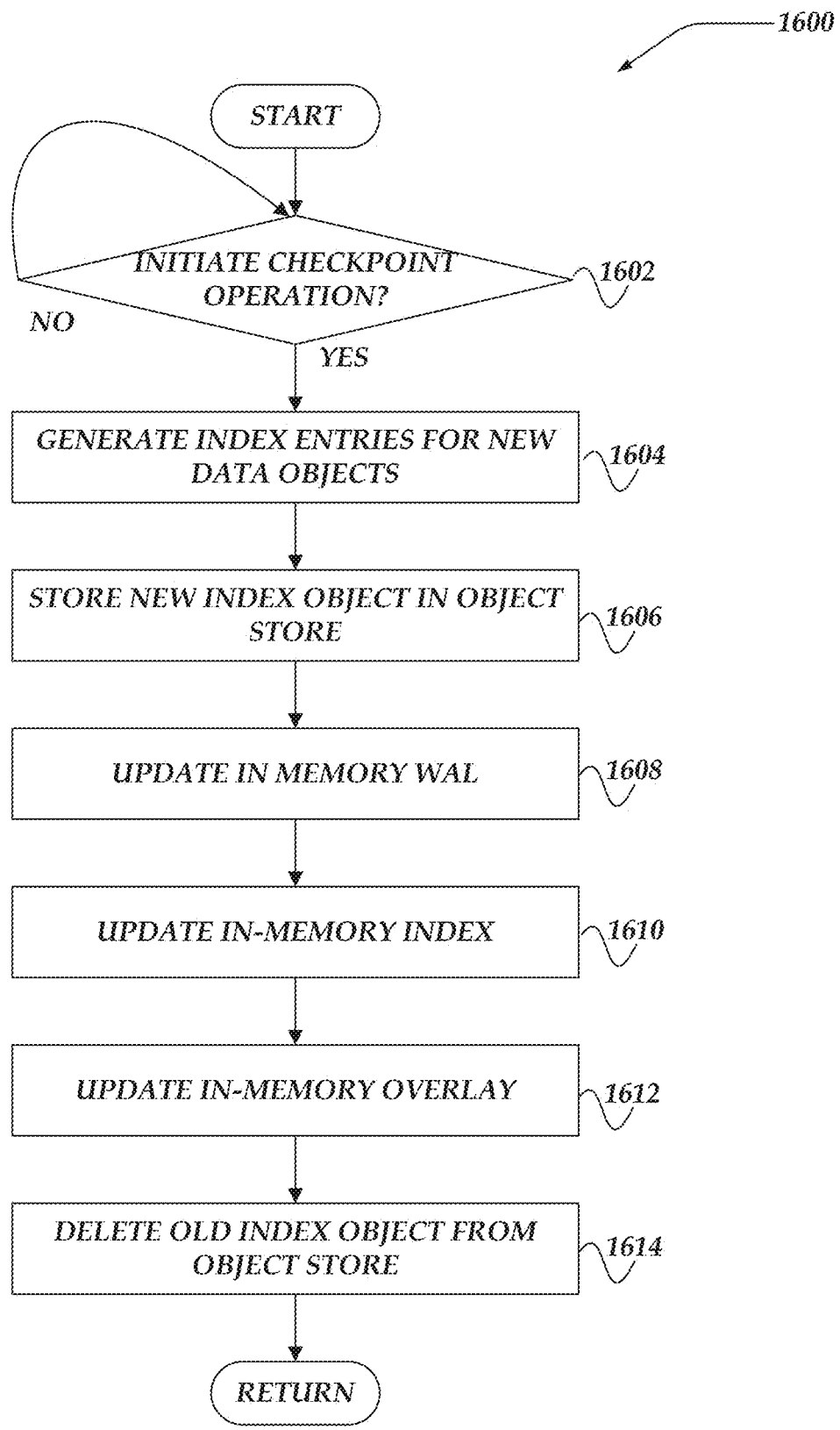
FIG. 16 illustrates a flowchart for a process for object-based storage with garbage collection and data consolidation in accordance with one or more of the various embodiments.

FIG. 16 illustrates a flowchart for process 1600 for object-based storage with garbage collection and data consolidation in accordance with one or more of the various embodiments. After a start flowchart block, at flowchart decision block 1602, in one or more of the various embodiments, if a checkpoint operation may be initiated, control may flow to flowchart block 1604; otherwise, control may loop back to flowchart decision block 1602. As mentioned herein, as write requests may be processed, file system engines may initially generate WAL objects that store WAL entries and their associated data blocks, if any. Note, in some cases, WAL entries may be cached in one or more write caches before being stored in object storage as WAL objects. Further, in some cases, such as, large-sized writes, WAL entries and their associated data blocks may be written directly to the object store as WAL objects. However, for the purposes of process 1600 the WAL objects of interest may be considered to be in the object store.

In one or more of the various embodiments, file system engines may be arranged to initiate checkpoint operations periodically or conditionally as per a checkpoint policy (which may be part of file system policy). For example, in some embodiments, checkpoint operations may be configured to occur every minute, every 10 minutes, each hour, or the like. Additionally, in some embodiments, conditions such as file system utilization, file system activity, number of stored WAL objects, or the like, may be considered in checkpoint policies. Further, in some embodiments, file system engines may be arranged to provide one or more user interfaces that enable users or administrators to initiate checkpoint operations on-demand.

At flowchart block 1604, in one or more of the various embodiments, file system engines may be arranged to generate one or more index entries for the one or more new data objects. In some embodiments, file system engines may be arranged to compute index entries to include mappings from data blocks to the WAL objects. Accordingly, in some embodiments, file system engines may be arranged to generate index entries that show which data object contains which data blocks.

At flowchart block 1606, in one or more of the various embodiments, file system engines may be arranged to store the new index object in the object store. As mentioned herein, index objects stored in object stores may be immutable. Accordingly, in some embodiments, updating the index to include the new index entries may require the generation of a new index object. Thus, in some embodiments, file system engines may be arranged to execute one or more cloud computing provider APIs to store the new index object in the object store.

At flowchart block 1608, in one or more of the various embodiments, file system engines may be arranged to update the WAL to remove records of successfully checkpointed WAL objects. As mentioned above, in some embodiments, WAL objects may be converted in-place without accessing the WAL object directly. Accordingly file system engines may be arranged to convert WAL objects to data objects by updating the index object to reference the data blocks in the WAL object. Thus, in some embodiments, the objects referred to as WAL objects may remain in the object store but are now considered data objects since the index object includes entries that map data blocks (addresses) to the data objects that were previously considered WAL objects. Note, in some cases, WAL objects may include WAL related meta-data that may be ignored for data objects even though it may be left in-place.

At flowchart block 1610, in one or more of the various embodiments, file system engines may be arranged to update the in-memory index. As mentioned, the in-memory index held by coordinator agents may mirror the index object to facilitate rapid determination of which data object may contain particular data blocks.

At flowchart block 1612, in one or more of the various embodiments, file system engines may be arranged to update the in-memory overlay. As mentioned above, the in-memory overlay data structure may be used by coordinator agents to determine if data blocks of interest may be located in WAL objects rather than being located in data objects.

At flowchart block 1614, in one or more of the various embodiments, file system engines may be arranged to delete the previous index object from the object store. Note, in some cases, the previous index object may be deleted at the same time the new index object is stored into the object store. Further, in some embodiments, the removal of old index objects may be deferred until the next checkpoint operation or next garbage collection operation. Also, in some embodiments, old index objects may be replaced by the new index object.

Next, in one or more of the various embodiments, control may be returned to a calling process.

Figure 17:
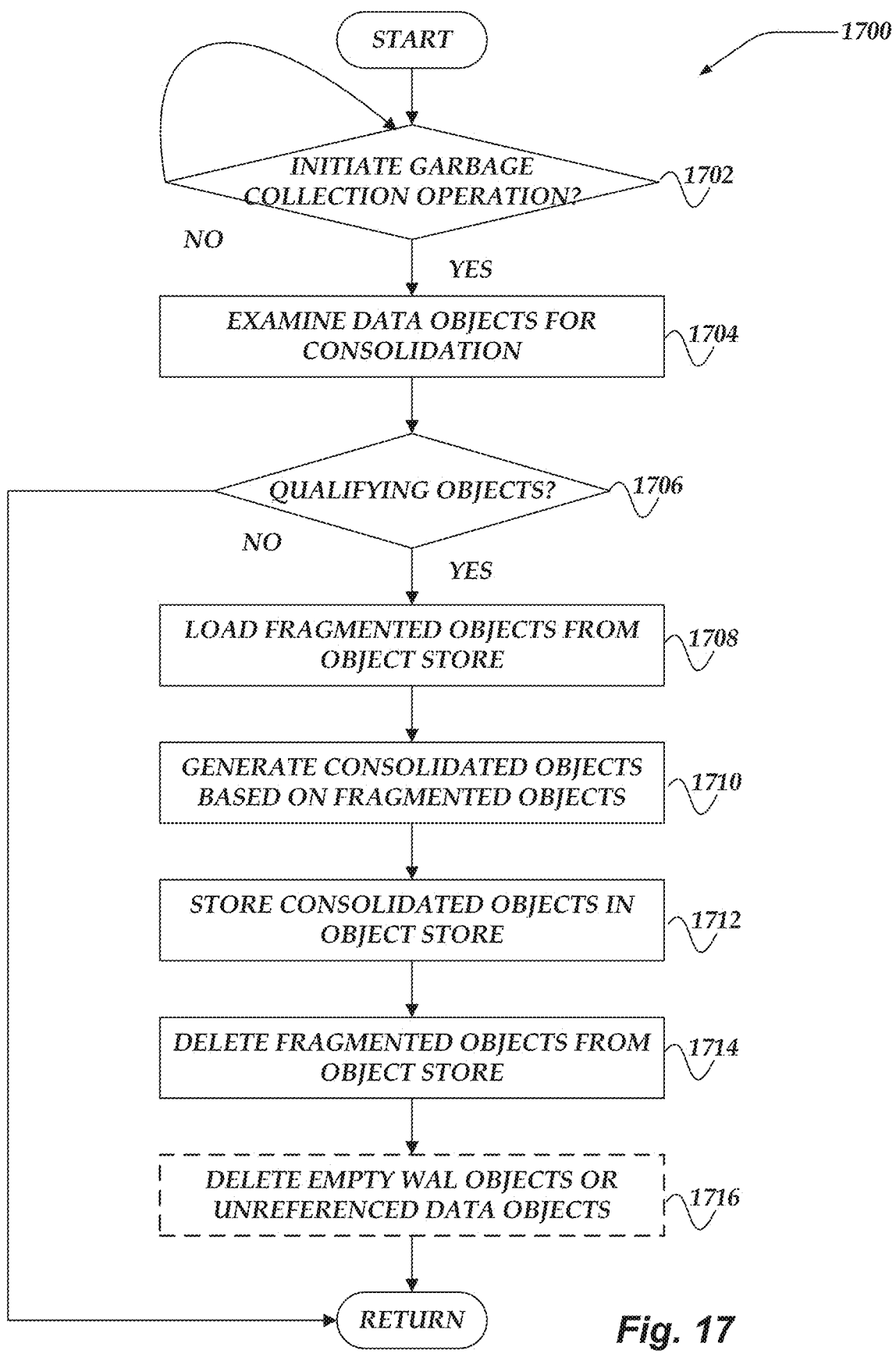
FIG. 17 illustrates a flowchart for a process for object-based storage with garbage collection and data consolidation in accordance with one or more of the various embodiments.

FIG. 17 illustrates a flowchart for process 1700 for object-based storage with garbage collection and data consolidation in accordance with one or more of the various embodiments. After a start flowchart block, at flowchart decision block 1702, in one or more of the various embodiments, if garbage collection may be initiated, control may flow to block 1704; otherwise, control may loop back to flowchart decision block 1702. In some embodiments, file system engines may be arranged to periodically or conditionally execute garbage collection operations. Also, in some embodiments, file system engines may be arranged to provide one or more user interfaces that enable file system administrators to initiate garbage collection operations on demand.

In some embodiments, file system engines may be arranged to apply rules, conditions, or the like, declared in garbage collection policies to determine if garbage collection may be initiated. For example, a garbage collection policy for a low activity file system may declare that garbage collection should occur every hour while another garbage collection policy for a high-activity file system may declare that garbage collection should occur every ten minutes, and so on.

At flowchart block 1704, in one or more of the various embodiments, file system engines may be arranged to examine data objects for consolidation or fragmentation. In some embodiments, file system engines may be arranged to evaluate if data objects may qualify for garbage collection. Accordingly, in some embodiments, file system engines may be arranged to examine one or more characteristics associated with data objects to determine if they may qualify for garbage collection. In some embodiments, file system engines may be arranged to store meta-data for evaluating data objects in the in-memory index or other in-memory data structures. In some embodiments, this meta-data may include reference counts, size of data objects, number of data blocks, age of data object, last access times, or the like. In some embodiments, the particular meta-data if evaluating data objects for garbage collection may vary depending on file system policies, garbage collection policies, or the like.

In some embodiments, a garbage collection policy may include one or more heuristics that may be applied to determine if a data object qualifies for garbage collection. For example, in some embodiments, a garbage collection policy may be configured to score data objects based on their life-time duration and reference count values. In some embodiments, reference count values may track how many data blocks (or pages of data blocks) have been selected for deletion or otherwise invalidated. In this example, if a data object has been alive for time t, the heuristic may make an assumption that the data object will remain in use for at least 2t (twice the current duration). Accordingly, in this example, the file system engines may compute a cost of garbage collecting the data object versus the cost of the amount of wasted storage space that would be freed if the data object is removed from the object store or consolidated. For example, in some embodiments, file system engines may predict the number of actions (e.g., cloud computing provider API calls, memory allocations, network bandwidth consumption, or the like) that may be required for a particular garbage collection. Thus, in some embodiments, if the cost of performing a garbage collection may be less than the cost of the wasted storage space in a data object, the data object may qualify for garbage collection.

Also, in some embodiments, garbage collection operations may consolidate two or more smaller data objects into a larger data object. Accordingly, in some embodiments, garbage collection policies may include heuristics that do a cost-benefit analysis of consolidating the smaller data objects. For example, in some embodiments, cloud computing providers may put limits on the number of objects that may be included in an object store. Likewise, in some embodiments, cloud computing providers may have pricing models that may make it disadvantageous to exceed a given number of data objects.

At flowchart decision block 1706, in one or more of the various embodiments, if there may be one or more qualifying objects in the object store, control may flow to flowchart block 1708; otherwise, control may flow to flowchart block 1710.

At flowchart block 1708, in one or more of the various embodiments, file system engines may be arranged to load one or more qualifying data objects from the object store. As mentioned, in most cases, cloud computing providers do not enable objects in object stores to be modified in place. Accordingly, in some embodiments, file system engines may be arranged to issue one or more cloud computing provider APIs to retrieve the one or more qualified data objects from the object store. In some embodiments, file system engines may retrieve data objects by submitting their corresponding object identifier to the cloud computing provider API. Accordingly, in one or more of the various embodiments, file system engines may retrieve the qualified data objects without iterating or listing the all of objects in the object store that may be selected for garbage collection.

At flowchart block 1710, in one or more of the various embodiments, file system engines may be arranged to generate consolidated objects based on the one or more fragmented objects. As mentioned above, in some embodiments, data blocks marked for deletion may be included in data objects that include other data blocks that may not be marked for deletion. Accordingly, in some embodiments, file system engines may be arranged to generate a new data object that omits the data blocks marked for deletion. In this context this may be referred to as defragmenting the data object. Similarly, in some embodiments, one or more smaller data objects may be consolidated into a single data object.

At flowchart block 1712, in one or more of the various embodiments, file system engines may be arranged to store the one or more consolidated objects in the object store. In some embodiments, file system engines may be arranged to execute one or more cloud computing provider APIs to store the new data object that is containing the remaining (non-deleted) data blocks to the object store.

Further, in some embodiments, file system engines may be arranged to perform one or more accounting operations to update the index object to ensure its entries include the references to the new data object and remove entries that may be associated with the old fragmented data objects or the deleted data blocks. In some embodiments, if the index object stored in the object store may be updated, the file system engines may be arranged to generate a new index object that may be stored to the object store while the previous version of the index object may be deleted from the object store.

At flowchart block 1714, in one or more of the various embodiments, file system engines may be arranged to delete the one or more fragmented objects from the object store. In some embodiments, file system engines may be arranged to issue one or more cloud computing provider APIs to delete the fragmented data objects that were replaced by the new consolidated/defragmented data objects. Likewise, in some embodiments, if smaller data objects have been consolidated into larger data objects, the smaller data objects may be removed from the object store.

At flowchart block 1716, in one or more of the various embodiments, optionally, file system engines may be arranged to delete one or more empty WAL objects or unreferenced data objects from the object store. As mentioned, in some embodiments, WAL objects corresponding to one or more requests may be stored in the object store. In some cases, for some embodiments, one or more WAL objects may be empty because they correspond to delete operations. Accordingly, in some embodiments, these WAL objects may not have data blocks so checkpoint operations will not convert them to data objects. Thus, in some embodiments, if there may be 'empty' WAL objects that may be removed from the object store. Likewise, in some embodiments, regular unreferenced data objects may be deleted. Note, in this case, unreferenced data objects may be data objects where users (or system activity) have 'deleted' all of the data blocks included in the data object.

Note, this block is indicated as being optional because in some cases there may not be any WAL objects eligible for garbage collection.

Figure 18:
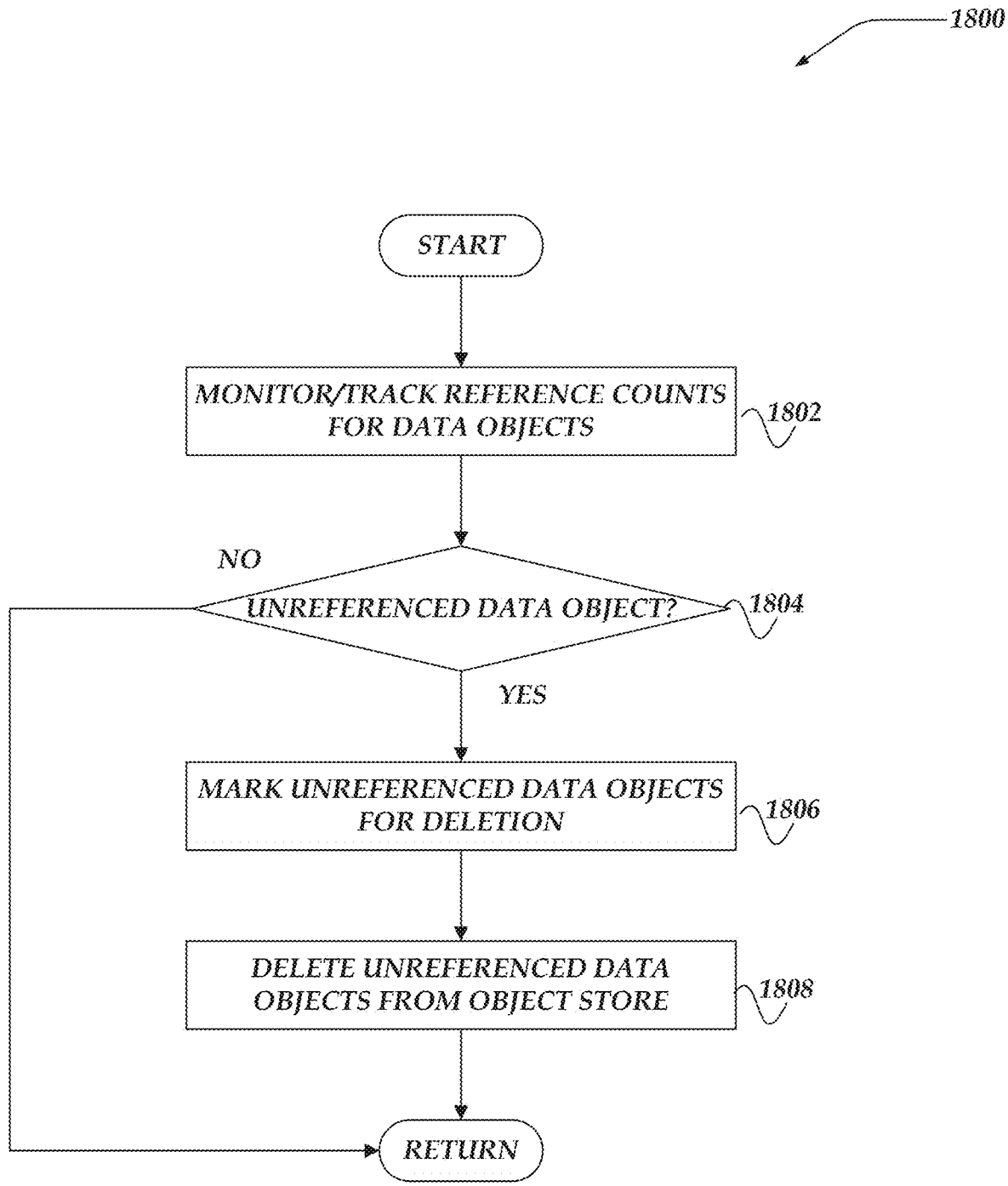
FIG. 18 illustrates a flowchart for a process for object-based storage with garbage collection and data consolidation in accordance with one or more of the various embodiments.

Next, in one or more of the various embodiments, control may be returned to a calling process FIG. 18 illustrates a flowchart for process 1800 for object-based storage with garbage collection and data consolidation in accordance with one or more of the various embodiments. After a start flowchart block, at flowchart decision block 1802, in one or more of the various embodiments, file system engines may be arranged to monitor or track reference counts for the data objects. In one or more of the various embodiments, each time data may be written to a data object, a ref-count value for that object may be incremented. Similarly, in some embodiments, as the file system engine processes deletes for a data object, the ref-count value for that data object may be decremented. Note, in some embodiments, because data objects may be immutable the ref-count value for a data object may be determined when it is created. Thus, in some embodiments, file system engines may be arranged to initialize ref-count values for data objects based on the number of data blocks included in the data object when it is created. Note, in some cases, for some embodiments, ref-count values may be configured to correspond to groups of data blocks (e.g., pages) rather than mapping one-to-one to individual data blocks. In some embodiments, the particular size of a page or other data block grouping may vary depending on local requirements or local circumstances. Accordingly, in some embodiments, page size or grouping size may be determined based on configuration information.

At flowchart decision block 1804, in one or more of the various embodiments, if a data object may be unreferenced, control may flow to flowchart block 1806; otherwise, control may be returned to a calling process. In some embodiments, as users of the file system submit delete requests, ref-count values of the corresponding data objects may be decremented. Note, these data objects may still include the 'deleted' data because in most cases data objects in object store may be immutable such that once they are stored, the data they include may not be changed short of deleting the entire data object. Likewise, in some embodiments, as data blocks in data objects may be superseded or otherwise invalidated by subsequent file system activity, the ref-counts of their data objects may be decremented.

At flowchart block 1806, in one or more of the various embodiments, file system engines may be arranged to mark unreferenced data objects for deletion. In some embodiments, marking unreferenced data blocks for deletion enable file system engines to determine an advantageous time to perform garbage collection or object consolidation. Also, in some cases, for some embodiments, file system engines may be configured to immediately delete unreferenced data objects.

At flowchart block 1808, in one or more of the various embodiments, file system engines may be arranged to delete the one or more unreferenced data objects from the object store. In some embodiments, file system engines may be arranged to delete the one or more data objects that may be associated with zero-value ref-count. In some embodiments, a zero-value ref-count may indicate that file system users have sent delete requests for all of the data blocks or otherwise invalidated the data blocks included in the data object. Accordingly, in some embodiments, file system engines may be arranged to execute one or more cloud computing provider APIs to remove the unreferenced data objects from the object store.

In some embodiments, file system engines may be arranged to delete unreferenced data objects as part of checkpoint operations or garbage collection operations.

Next, in one or more of the various embodiments, control may be returned to a calling process.

It will be understood that each flowchart block in each flowchart illustration, and combinations of flowchart blocks in each flowchart illustration, can be implemented by computer program instructions. These program instructions may be provided to a processor to produce a machine, such that the instructions, which execute on the processor, create means for implementing the actions specified in each flowchart block or flowchart blocks. The computer program instructions may be executed by a processor to cause a series of operational steps to be performed by the processor to produce a computer-implemented process such that the instructions, which execute on the processor, provide steps for implementing the actions specified in each flowchart block or flowchart blocks. The computer program instructions may also cause at least some of the operational steps shown in the flowchart blocks of each flowchart to be performed in parallel. Moreover, some of the steps may also be performed across more than one processor, such as might arise in a multi-processor computer system. In addition, one or more flowchart blocks or combinations of flowchart blocks in each flowchart illustration may also be performed concurrently with other flowchart blocks or combinations of flowchart blocks, or even in a different sequence than illustrated without departing from the scope or spirit of the invention.

Accordingly, each flowchart block in each flowchart illustration supports combinations of means for performing the specified actions, combinations of steps for performing the specified actions and program instruction means for performing the specified actions. It will also be understood that each flowchart block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors to execute instructions that are configured to cause performance of actions, comprising:

determining an object store for one or more write requests provided by a file system client based on the file system, wherein each write request includes one or more data blocks associated with a write transaction;

generating one or more write ahead log (WAL) entries that include the one or more data blocks, wherein one or more of a rule, instruction or a library is employed to determine one or more types of index data structures selected from a plurality of types of data structures for efficiently including the one or more data blocks with a WAL entry;

generating a WAL object based on the one or more WAL entries;

storing the WAL object in the object store;

updating an in-memory overlay with the one or more types of determined index data structures to associate the one or more data blocks with the WAL object;

deleting each WAL object in the object store that is unassociated with one or more data blocks and deleting each non-referenced data object in the object store; and employing a threshold for a number of WAL objects stored in the object store to initiate a checkpoint operation that performs further actions, including:

generating an index object that includes one or more index entries that associate one or more other data blocks with one or more data objects stored in the object store;

updating the index object to include one or more index entries that associate the one or more data blocks with the WAL object;

storing the updated index object in the object store, wherein the WAL object is converted to a data object based on the WAL object being referenced in the updated index object;

updating the in-memory overlay to remove the association of the one or more data blocks and the WAL object; and initiating garbage collection for one or more data objects stored in the object store based on one or more additional financial costs charged by a cloud computing provider of an application programming interface (API) for the file system due to one or more of an amount of stored data objects being above a predetermined amount for the object store or a total amount of data objects.

2. The method of claim 1, further comprising:
invalidating a portion of a page cache that includes a copy of the one or more data blocks.

3. The method of claim 1, further comprising:
determining the object store for one or more read requests provided by the file system client based on the file system, wherein each read request includes address information for one or more read data blocks associated with a read transaction;

employing the in-memory index to determine a data object in the object store that includes the one or more read data blocks;

loading the determined data object from the object store;

determining the one or more read data blocks in the loaded data object based on the address information; and sending a response to the file system client that includes a copy of the one or more read data blocks.

4. The method of claim 1, further comprising:
determining the object store for one or more read requests provided by the file system client based on the file system, wherein each read request includes address information for one or more read data blocks associated with a read transaction;

employing the in-memory overlay to determine a WAL object in the object store that includes the one or more read data blocks;

loading the determined WAL object from the object store;

determining the one or more read data blocks in the loaded WAL object based on the address information; and sending a response to the file system client that includes a copy of the one or more read data blocks.

5. The method of claim 1, further comprising:
determining an amount of waste data stored in the object store based on one or more metrics;

initiating the garbage collection operation based on one or more of the amount of waste data and a cost to store the waste space in the object store exceeding another cost of executing the garbage collection operation;

determining one or more fragmented data objects in the object store that include the waste data based on one or more reference counters;

generating zero or more consolidated data objects that exclude the waste data based on the one or more fragmented data objects;

storing the zero or more consolidated data objects in the object store; and updating the overlay to include zero or more references to the zero or more consolidated data objects, or performing additional actions, including:

loading a current index object from the object store;

generating a modified index object based on the current index object and the zero or more consolidated data objects, wherein the modified index object is stored in the object store; and removing the one or more fragmented data objects and the current index object from the object store.

6. The method of claim 1, wherein the one or more data objects further comprise:
an index block in each data object that references a location of each data block included in the one or more data objects, wherein the index block is located at the beginning of the one or more data objects.

7. The method of claim 1, wherein executing a checkpoint operation, further comprises:
determining one or more globally committed WAL objects that correspond to one or more committed write transactions;

determining one or more locally committed WAL objects that are associated with one or more uncommitted write transactions; and excluding the one or more locally committed WAL objects from the checkpoint operation.

8. A system for managing data in a file system comprising:
a network computer, comprising:
a memory that stores at least instructions; and
one or more processors that execute instructions that are configured to cause performance of actions, including:

determining an object store for one or more write requests provided by a file system client based on the file system, wherein each write request includes one or more data blocks associated with a write transaction;

generating one or more write ahead log (WAL) entries that include the one or more data blocks, wherein one or more of a rule, instruction or a library is employed to determine one or more types of index data structures selected from a plurality of types of data structures for efficiently including the one or more data blocks with a WAL entry;

generating a WAL object based on the one or more WAL entries;

storing the WAL object in the object store;

updating an in-memory overlay with the one or more types of determined index data structures to associate the one or more data blocks with the WAL object;

deleting each WAL object in the object store that is unassociated with one or more data blocks and deleting each non-referenced data object in the object store; and employing a threshold for a number of WAL objects stored in the object store to initiate a checkpoint operation that performs further actions, including:

generating an index object that includes one or more index entries that associate one or more other data blocks with one or more data objects stored in the object store;

updating the index object to include one or more index entries that associate the one or more data blocks with the WAL object;

storing the updated index object in the object store, wherein the WAL object is converted to a data object based on the WAL object being referenced in the updated index object; and updating the in-memory overlay to remove the association of the one or more data blocks and the WAL object; and initiating garbage collection for one or more data objects stored in the object store based on one or more additional financial costs charged by a cloud computing provider of an application programming interface (API) for the file system due to one or more of an amount of stored data objects being above a predetermined amount for the object store or a total amount of data objects; and one or more client computers, comprising:
a memory that stores at least instructions; and
one or more processors that execute instructions that are configured to cause performance of other actions, including:
providing the one or more write requests to the file system.

9. The system of claim 8, wherein the one or more network computer processors execute instructions that are configured to cause performance of actions, further comprising:
invalidating a portion of a page cache that includes a copy of the one or more data blocks.

10. The system of claim 8, wherein the one or more network computer processors execute instructions that are configured to cause performance of actions, further comprising:
determining the object store for one or more read requests provided by the file system client based on the file system, wherein each read request includes address information for one or more read data blocks associated with a read transaction;
employing the in-memory index to determine a data object in the object store that includes the one or more read data blocks;
loading the determined data object from the object store;
determining the one or more read data blocks in the loaded data object based on the address information; and
sending a response to the file system client that includes a copy of the one or more read data blocks.

11. The system of claim 8, wherein the one or more network computer processors execute instructions that are configured to cause performance of actions, further comprising:
determining the object store for one or more read requests provided by the file system client based on the file system, wherein each read request includes address information for one or more read data blocks associated with a read transaction;
employing the in-memory overlay to determine a WAL object in the object store that includes the one or more read data blocks;
loading the determined WAL object from the object store;
determining the one or more read data blocks in the loaded WAL object based on the address information; and
sending a response to the file system client that includes a copy of the one or more read data blocks.

12. The system of claim 8, wherein the one or more network computer processors execute instructions that are configured to cause performance of actions, further comprising:
determining an amount of waste data stored in the object store based on one or more metrics;
initiating a garbage collection operation based on one or more of the amount of waste data and a cost to store the waste space in the object store exceeding another cost of executing the garbage collection operation;
determining one or more fragmented data objects in the object store that include the waste data based on one or more reference counters;
generating zero or more consolidated data objects that exclude the waste data based on the one or more fragmented data objects;
storing the zero or more consolidated data objects in the object store; and
updating the overlay to include zero or more references to the zero or more consolidated data objects, or performing additional actions, including:
loading a current index object from the object store;
generating a modified index object based on the current index object and the zero or more consolidated data objects, wherein the modified index object is stored in the object store; and
removing the one or more fragmented data objects and the current index object from the object store.

13. The system of claim 8, wherein the one or more data objects further comprise:
an index block in each data object that references a location of each data block included in the one or more data objects, wherein the index block is located at the beginning of the one or more data objects.

14. The system of claim 8, wherein executing a checkpoint operation, further comprises:
determining one or more globally committed WAL objects that correspond to one or more committed write transactions;
determining one or more locally committed WAL objects that are associated with one or more uncommitted write transactions; and
excluding the one or more locally committed WAL objects from the checkpoint operation.

15. A processor readable non-transitory storage media that includes instructions for managing data in a file system over a network, wherein execution of the instructions by one or more processors on one or more network computers performs actions, comprising:
determining an object store for one or more write requests provided by a file system client based on the file system, wherein each write request includes one or more data blocks associated with a write transaction;
generating one or more write ahead log (WAL) entries that include the one or more data blocks, wherein one or more of a rule, instruction or a library is employed to determine one or more types of index data structures selected from a plurality of types of data structures for efficiently including the one or more data blocks with a WAL entry;
generating a WAL object based on the one or more WAL entries;

storing the WAL object in the object store;
updating an in-memory overlay with the one or more types of determined index data structures to associate the one or more data blocks with the WAL object;
deleting each WAL object in the object store that is unassociated with one or more data blocks and deleting each non-referenced data object in the object store; and
employing a threshold for a number of WAL objects stored in the object store to initiate a checkpoint operation that performs further actions, including:
  generating an index object that includes one or more index entries that associate one or more other data blocks with one or more data objects stored in the object store;
  updating the index object to include one or more index entries that associate the one or more data blocks with the WAL object;
  storing the updated index object in the object store, wherein the WAL object is converted to a data object based on the WAL object being referenced in the updated index object; and
  updating the in-memory overlay to remove the association of the one or more data blocks and the WAL object; and
initiating garbage collection for one or more data objects stored in the object store based on one or more additional financial costs charged by a cloud computing provider of an application programming interface (API) for the file system due to one or more of an amount of stored data objects being above a predetermined amount for the object store or a total amount of data objects.

16. The media of claim 15, further comprising:
invalidating a portion of a page cache that includes a copy of the one or more data blocks.

17. The media of claim 15, further comprising:
determining the object store for one or more read requests provided by the file system client based on the file system, wherein each read request includes address information for one or more read data blocks associated with a read transaction;
employing the in-memory index to determine a data object in the object store that includes the one or more read data blocks;
loading the determined data object from the object store;
determining the one or more read data blocks in the loaded data object based on the address information; and
sending a response to the file system client that includes a copy of the one or more read data blocks.

18. The media of claim 15, further comprising:
determining the object store for one or more read requests provided by the file system client based on the file system, wherein each read request includes address information for one or more read data blocks associated with a read transaction;
employing the in-memory overlay to determine a WAL object in the object store that includes the one or more read data blocks;
loading the determined WAL object from the object store;
determining the one or more read data blocks in the loaded WAL object based on the address information; and
sending a response to the file system client that includes a copy of the one or more read data blocks.

19. The media of claim 15, further comprising:
determining one or more of an amount of waste data stored in the object store based on one or more metrics;
initiating a garbage collection operation based on one or more of the amount of waste data and a cost to store the waste space in the object store exceeding another cost of executing the garbage collection operation;
determining one or more fragmented data objects in the object store that include the waste data based on one or more reference counters;
generating zero or more consolidated data objects that exclude the waste data based on the one or more fragmented data objects;
storing the zero or more consolidated data objects in the object store; and
updating the overlay to include zero or more references to the zero or more consolidated data objects, or performing additional actions, including:
  loading a current index object from the object store;
  generating a modified index object based on the current index object and the zero or more consolidated data objects, wherein the modified index object is stored in the object store; and
  removing the one or more fragmented data objects and the current index object from the object store.

20. The media of claim 15, wherein the one or more data objects further comprise:
an index block in each data object that references a location of each data block included in the one or more data objects, wherein the index block is located at the beginning of the one or more data objects.

21. The media of claim 15, wherein executing a checkpoint operation, further comprises:
determining one or more globally committed WAL objects that correspond to one or more committed write transactions;
determining one or more locally committed WAL objects that are associated with one or more uncommitted write transactions; and
excluding the one or more locally committed WAL objects from the checkpoint operation.

22. A network computer for managing data in a file system, comprising:
a memory that stores at least instructions; and
one or more processors that execute instructions that are configured to cause performance of actions, including:
  determining an object store for one or more write requests provided by a file system client based on the file system, wherein each write request includes one or more data blocks associated with a write transaction;
  generating one or more write ahead log (WAL) entries that include the one or more data blocks, wherein one or more of a rule, instruction or a library is employed to determine one or more types of index data structures selected from a plurality of types of data structures for efficiently including the one or more data blocks with a WAL entry;
  generating a WAL object based on the one or more WAL entries;
  storing the WAL object in the object store;
  updating an in-memory overlay with the one or more types of determined index data structures to associate the one or more data blocks with the WAL object;
  deleting each WAL object in the object store that is unassociated with one or more data blocks and deleting each non-referenced data object in the object store; and employing a threshold for a number of WAL objects stored in the object store to initiate a checkpoint operation that performs further actions, including:
　generating an index object that includes one or more index entries that associate one or more other data blocks with one or more data objects stored in the object store;
　updating the index object to include one or more index entries that associate the one or more data blocks with the WAL object;
　storing the updated index object in the object store, wherein the WAL object is converted to a data object based on the WAL object being referenced in the updated index object; and
　updating the in-memory overlay to remove the association of the one or more data blocks and the WAL object; and
initiating garbage collection for one or more data objects stored in the object store based on one or more additional financial costs charged by a cloud computing provider of an application programming interface (API) for the file system due to one or more of an amount of stored data objects being above a predetermined amount for the object store or a total amount of data objects.

23. The network computer of claim 22, wherein the one or more processors execute instructions that are configured to cause performance of actions, further comprising:
　invalidating a portion of a page cache that includes a copy of the one or more data blocks.

24. The network computer of claim 22, wherein the one or more processors execute instructions that are configured to cause performance of actions, further comprising:
　determining the object store for one or more read requests provided by the file system client based on the file system, wherein each read request includes address information for one or more read data blocks associated with a read transaction;
　employing the in-memory index to determine a data object in the object store that includes the one or more read data blocks;
　loading the determined data object from the object store;
　determining the one or more read data blocks in the loaded data object based on the address information; and
　sending a response to the file system client that includes a copy of the one or more read data blocks.

25. The network computer of claim 22, wherein the one or more processors execute instructions that are configured to cause performance of actions, further comprising:
　determining the object store for one or more read requests provided by the file system client based on the file system, wherein each read request includes address information for one or more read data blocks associated with a read transaction;
　employing the in-memory overlay to determine a WAL object in the object store that includes the one or more read data blocks;
　loading the determined WAL object from the object store;
　determining the one or more read data blocks in the loaded WAL object based on the address information; and
　sending a response to the file system client that includes a copy of the one or more read data blocks.

26. The network computer of claim 22, wherein the one or more processors execute instructions that are configured to cause performance of actions, further comprising:
　determining an amount of waste data stored in the object store based on one or more metrics;
　initiating a garbage collection operation based on one or more of the amount of waste data and a cost to store the waste space in the object store exceeding another cost of executing the garbage collection operation;
　determining one or more fragmented data objects in the object store that include the waste data based on one or more reference counters;
　generating zero or more consolidated data objects that exclude the waste data based on the one or more fragmented data objects;
　storing the zero or more consolidated data objects in the object store; and
　updating the overlay to include zero or more references to the zero or more consolidated data objects, or performing additional actions, including:
　　loading a current index object from the object store;
　　generating a modified index object based on the current index object and the zero or more consolidated data objects, wherein the modified index object is stored in the object store; and
　　removing the one or more fragmented data objects and the current index object from the object store.

27. The network computer of claim 22, wherein the one or more data objects further comprise:
　an index block in each data object that references a location of each data block included in the one or more data objects, wherein the index block is located at the beginning of the one or more data objects.

28. The network computer of claim 22, wherein executing a checkpoint operation, further comprises:
　determining one or more globally committed WAL objects that correspond to one or more committed write transactions;
　determining one or more locally committed WAL objects that are associated with one or more uncommitted write transactions; and
　excluding the one or more locally committed WAL objects from the checkpoint operation.

* * * * *